(12) United States Patent
Kimoto et al.

(10) Patent No.: US 8,090,771 B2
(45) Date of Patent: *Jan. 3, 2012

(54) LOG COLLECTING/ANALYZING SYSTEM WITH SEPARATED FUNCTIONS OF COLLECTING LOG INFORMATION AND ANALYZING THE SAME

(75) Inventors: Yousuke Kimoto, Tokyo (JP); Kazuhiro Kanee, Tokyo (JP)

(73) Assignee: Sony Computer Entertainment Inc. (JP)

( * ) Notice: Subject to any disclaimer, the term of this patent is extended or adjusted under 35 U.S.C. 154(b) by 117 days.

This patent is subject to a terminal disclaimer.

(21) Appl. No.: 12/456,452

(22) Filed: Jun. 17, 2009

(65) Prior Publication Data

US 2009/0265424 A1 Oct. 22, 2009

Related U.S. Application Data

(63) Continuation of application No. 10/162,470, filed on Jun. 4, 2002, now Pat. No. 7,558,820.

(30) Foreign Application Priority Data

Jun. 4, 2001 (JP) .................................. 2001-167815
Jan. 17, 2002 (JP) .................................. 2002-008278

(51) Int. Cl.
*G06F 15/16* (2006.01)
*G06F 11/34* (2006.01)

(52) U.S. Cl. .............. 709/203; 463/29; 463/43; 707/10; 707/104.1

(58) Field of Classification Search .................. 709/224, 709/206; 702/184; 370/242
See application file for complete search history.

(56) References Cited

U.S. PATENT DOCUMENTS

| | | | |
|---|---|---|---|
| 5,675,510 A | 10/1997 | Coffey et al. | |
| 5,819,094 A | 10/1998 | Sato et al. | |
| 5,916,024 A | 6/1999 | Von Kohorn | |
| 6,052,728 A | 4/2000 | Fujiyama et al. | |
| 6,138,250 A | 10/2000 | Nouri et al. | |
| 6,219,701 B1 | 4/2001 | Hirata et al. | |
| 6,289,379 B1 | 9/2001 | Urano et al. | |
| 6,505,245 B1 | 1/2003 | North et al. | |
| 6,704,287 B1 * | 3/2004 | Moharram | 370/242 |
| 6,789,115 B1 | 9/2004 | Singer et al. | |
| 6,976,031 B1 | 12/2005 | Toupal et al. | |
| 2002/0021788 A1 | 2/2002 | Kasvand et al. | |
| 2002/0046273 A1 * | 4/2002 | Lahr et al. | 709/224 |
| 2002/0152305 A1 | 10/2002 | Jackson et al. | |
| 2003/0126613 A1 | 7/2003 | McGuire | |
| 2005/0028171 A1 | 2/2005 | Kougiouris et al. | |

(Continued)

FOREIGN PATENT DOCUMENTS

EP 0 913 774 5/1999

(Continued)

*Primary Examiner* — Dustin Nguyen
(74) *Attorney, Agent, or Firm* — Lerner, David, Littenberg, Krumholz & Mentlik, LLP

(57) ABSTRACT

A log collecting/analyzing system has a log collection terminal device as a client terminal device which collects logs and transmits the collected logs to a log server via a network. The log server receives the transmitted logs and stores the received logs for analysis. According to this configuration, it is possible to obtain useful information, such as information about what play modes are popular in the case of games and so forth, or information about what characters are popular in the case of selecting a character for a game. Therefore, it is possible to make use of the result of log analysis to develop the game.

22 Claims, 24 Drawing Sheets

U.S. PATENT DOCUMENTS

2007/0100585 A1 * 5/2007 Dulberg et al. ............... 702/184

FOREIGN PATENT DOCUMENTS

| | | |
|---|---|---|
| EP | 0 992 910 A1 | 4/2000 |
| JP | 61-043354 A | 3/1986 |
| JP | 02-259862 A | 10/1990 |
| JP | 07-021059 A | 1/1995 |
| JP | 09-282275 A | 10/1997 |
| JP | 09-319575 A | 12/1997 |
| JP | 10-091556 A | 4/1998 |
| JP | 10-510647 A | 10/1998 |
| JP | 10-312323 A | 11/1998 |
| JP | 11-143737 A | 5/1999 |
| JP | 11-224212 A | 8/1999 |
| JP | 2000-345979 A | 12/2000 |
| JP | 2001-101036 A | 4/2001 |
| JP | 2001-350652 A | 12/2001 |
| WO | WO-01/02932 A2 | 1/2001 |
| WO | WO-01/39012 A2 | 5/2001 |

* cited by examiner

FIG. 12

```xml
<PlayMode>
   <playDate>2000,12,24</playDate>
   <mode>
      <name>PracticeMode</name>
      <selectedTimes>3</selectedTimes>
   </mode>
   <mode>
      <name>TournamentMode</name>
      <selectedTimes>5</selectedTimes>
   </mode>
   <mode>
      <name>SeasonMode</name>
      <selectedTimes>7</selectedTimes>
   </mode>
   <mode>
      <name>CustomiseMode</name>
      <selectedTimes>10</selectedTimes>
   </mode>
</PlayMode>
```

FIG. 13

```xml
<?xml version="1.0" encoding="Shift_JIS"?>
<Log>
  <Info>
    <AppID>LOG APPLICATION ID</AppID>
    <UserID>LOG USER ID</UserID>
  </Info>                                              ~51
  <DATA interfaceID="INTERFACE ID1">
    LOG RECORDED BY INTERFACE ID1...
  </DATA>                                              ~52
  <DATA interfaceID="INTERFACE ID2">
    LOG RECORDED BY INTERFACE ID2...
  </DATA>
</Log>
```

FIG. 14

SetPlayDate("2000, 12, 24");  ~53
SetSelectedMode("SeasonMode");  ~54

FIG. 19A

| LOG USER ID | NAME | AGE | ADDRESS | TELEPHONE NUMBER | LOG STORAGE TABLE NAME | |
|---|---|---|---|---|---|---|
| .. | | | | | ● | → DESIGNATING LOG STORAGE TABLE FOR USER |
| .. | | | | | | UTILIZATION LOG APPLICATION MANAGEMENT TABLE NAME |

FIG. 19B

| LOG APPLICATION ID | FINAL LOG RECEPTION DATE AND TIME |
|---|---|
| .. | .. |
| | |

FIG. 19C

| LOG APPLICATION ID | LICENSEE NAME | AUTHENTICATION DATA | LOG STORAGE TABLE NAME | NUMBER OF ANALYSIS TABLE | LOG ANALYZED RESULT MANAGEMENT TABLE NAME | IN-SERVICE FLAG |
|---|---|---|---|---|---|---|
| .. | .. | | ● → DESIGNATING LOG STORAGE TABLE FOR LOG APPLICATION | | ● | |

| LOG RECEPTION ID | LOG RECEPTION DATE AND TIME | UTILIZATION LOG APPLICATION ID | LOG |
|---|---|---|---|
| ⋮ | | | |
| ⋮ | | | |

| LOG RECEPTION ID | LOG RECEPTION DATE AND TIME | LOG USER ID |
|---|---|---|
| ⋮ | | |
| ⋮ | | |

FIG. 24

| LOG USER ID | DATE OF PLAY | PRACTICE MODE | TOURNAMENT MODE | SEASON MODE | CUSTOMIZE MODE |
|---|---|---|---|---|---|
| 00001 | 12/24/00 | 3 | 5 | 7 | 10 |
| .. | | | | | |
| .. | | | | | |

LOG COLLECTING/ANALYZING SYSTEM WITH SEPARATED FUNCTIONS OF COLLECTING LOG INFORMATION AND ANALYZING THE SAME

CROSS-REFERENCE TO RELATED APPLICATIONS

This application is a continuation, of U.S. application Ser. No. 10/162,470, now U.S. Pat. No. 7,558,820, filed on Jun. 4, 2002, which application claims priority from Japanese patent application No. 2001-167815 filed on Jun. 4, 2001 and Japanese patent application No. 2002-8278 filed on Jan. 17, 2002. The disclosures of all said applications are hereby incorporated by reference herein.

BACKGROUND OF THE INVENTION

1. Field of the Invention

The present invention relates to a log collecting/analyzing system, a method of log collection, a log collection program, a method of log analysis, a log analysis program, a log collecting device, a log analyzing device, a log collection terminal device and a log server, all of which include separated functions of collecting log information and analyzing the collected log information, and in which the log information is collected at a client side and transmitted to a server side, and the server side stores the log information to analyze.

2. Related Art

Conventional log collecting/analyzing systems are used for the purpose of observing something in systems for providing certain services. For instance, if a log collecting/analyzing system is applied to some on-line system, it is possible to ascertain how unfair access, systems faults or so forth occurred by analyzing the log. In addition, if the log collecting/analyzing system is applied to a WWW (World Wide Web) server, it is possible to record details like what a client referred to, when, and what contents by analyzing the log. And, as a result, it becomes possible to learn the interest level of the user with respect to the contents for example.

However, in the conventional log collecting/analyzing systems described-above, when the contents for servicing are determined first, the contents for observing are also fixed depending on the determined contents for servicing. And, as a result, the collected log information requires a specialized analysis system. Accordingly, an analyzing system for observing the log at the on-line system is entirely different from an analyzing system for the log of the WWW server, for instance.

In addition, as for the method of log collection itself, an exclusive design and mounting are provided in every service system. For this reason, although only the basic function of collecting the log is desired, subtle differences are generated on log collection items. As a result, an exclusive design and mounting is required for every service as for the basic collecting system.

SUMMARY OF THE INVENTION

It is an object of the present invention to provide a log collecting/analyzing system, a method for log collection, a log collection program, a method for log analysis, a log analysis program, a log collecting device, a log analyzing device, a log collection terminal device and a log server, all of which are capable of performing flexible log collection and analysis without being a fixed log system as before.

A log collecting/analyzing system can have a configuration in which a client terminal device collects log information and transmits collected log information to a log server via a network, and then the log server stores the received log information to analyze. In addition, the client terminal device can be provided with a function for forming the basic structure of a log, a function for generating desired log information from the basic structure of the log and a function for transmitting the generated log information to the log server Namely, the log collection function can be separated into a basic collection function and a specific collection/analysis function, so that the basic log collection function is capable of being used as a common log collection function. According to this configuration, the log collecting/analyzing system using the log collection function may not need to conduct mounting of its basic function. In addition, it may be possible to design and mount specific collection/analysis functions more easily by using this basic collection function. As a result, it may be possible to collect effective logs. In addition, it may be possible to establish a common log form as well as a common analysis function.

In addition, log collection had an aspect in which utilization at an on-line system was taken to be an assumption. Heretofore, because utilization at the server side of service system was the main utilization. However, the log collection analysis function of the log system can be separated into a function of log collection for the client side and a function of log analysis for the server side. The client side can conduct collection of the log and the server side can conduct analyses of the log. The client side in such case can be capable of collecting the log in an off-line condition.

BRIEF DESCRIPTION OF THE DRAWINGS

The above and other features will be better understood from the exemplary embodiments described below, taken together with the drawings, in which:

FIG. 12 is a view illustrating an example of log data represented using XML (eXtensible Markup Language);

FIG. 13 is a view illustrating an example of a log object represented using XML;

FIG. 14 is a view illustrating an example of an API (Application Programming Interface) for forming log data;

FIG. 19A illustrates the configuration of a management database of a log: a view illustrating a management table of a log user;

FIG. 19B illustrates the configuration of a management database of a log: a view illustrating a management table of utilization of a log application;

FIG. 19C illustrates the configuration of a management database of a log: a view illustrating a management table of a log application;

FIG. 24 is a view illustrating an example of a storage table of a log analyzed result;

DETAILED DESCRIPTION

Preferred embodiments of the invention are described in detail below, with reference being made to the accompanying drawings. A specific embodiment to which the present invention is applied will be described in detail below, referring to the accompanying drawings.

The present embodiment provides an entirely new example of a log collecting/analyzing system in which a client side collects log information and transmits the collected log information to a server side, and the server side stores therein the transmitted log information to analyze. Namely, the present invention separates the function of the log collecting/analyzing system into two functions of collecting a log and storing/analyzing the collected log, in which the client side collects logs while the server side stores and analyzes the logs.

In addition, the function of the client side is to establish the basic structure of the log and then generate desired log information from the basic structure of the log. On the other hand, the function of the log server is to execute storage-analysis of the received log information and then analyze the log information in every application program.

The Configuration of the Entire Log Collecting/Analyzing System

In the first place, the rough flow of log collection, analysis and provision in the log collecting/analyzing system will be described.

Figure 1:
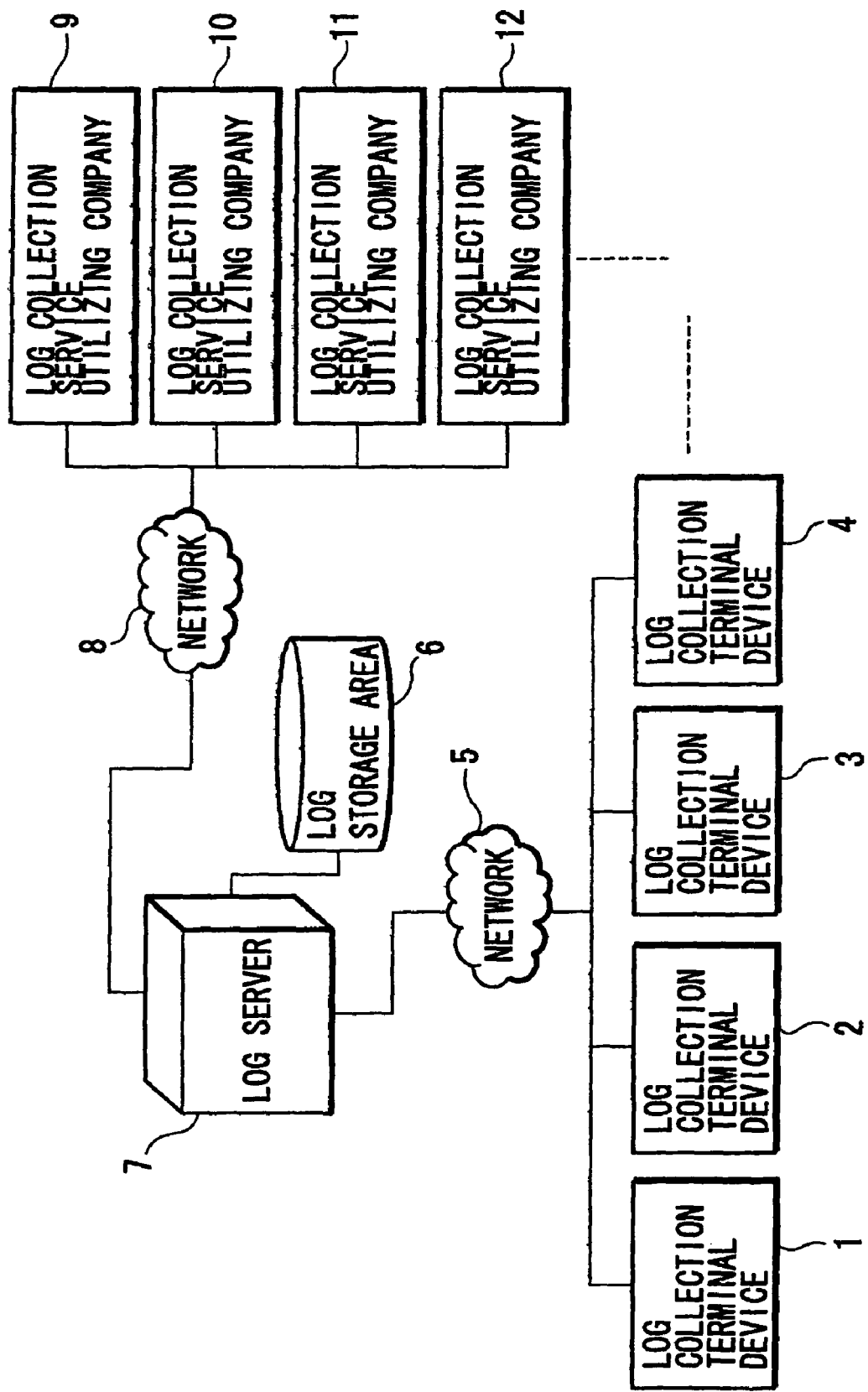
FIG. 1 is a block diagram illustrating the configuration of an entire log collecting/analyzing system.

FIG. 1 illustrates the configuration of the entire log collecting/analyzing system. Log collection terminal devices 1 to 4, being client terminal devices provided with client side software and client side hardware for collecting logs, are connected to network 5. It should be noted that any number of log collection terminal devices may be added to the network 5.

In the log collecting/analyzing system illustrated in FIG. 1, the log collection terminal devices 1 to 4 collect logs and store the logs therein temporarily. The log collection terminal devices 1 to 4 transmit log information that is collected and stored therein to log server 7 via the network 5. The log server 7 is provided with log storage area 6 for storing the received log information. The log server 7 reads out the stored log information from the log storage area 6 and then executes analysis processing of the log information before storing the analyzed result in the log storage area 6 again.

It should be noted that respective procedures for analysis processing executed by the log server 7 are defined by log collection service utilizing companies 9 to 12. In addition, the design and mounting are established so that the collection program when conducting log collection and analysis processing corresponds to the log collection side and the log analysis side, respectively.

Here, consideration is made in connection with the case that the log collection service utilizing companies 9 to 12 require an analyzed result of the log. At this time, to begin with, the log collection service utilizing companies 9 to 12 input acquisition requirements of the analyzed result to the log server 7 via the network 8. The log server 7 which has received the acquisition requirements from the log collection service utilizing companies 9 to 12 authenticates the log collection service utilizing companies 9 to 12 connected to the network and then adopts or rejects companies 9 to 12 on the basis of the authentication result. After that, the log server 7 transmits the log analyzed result to the authenticated companies. It should be noted that a plurality of log collection service utilizing companies are connectable to the log server 7 via the network 8. Then, the log server 7 is capable of transmitting the log analyzed result to any of the log collection service utilizing companies 9 to 12 that are authenticated to be connected to the log server 7 via the network 8.

Log Collection Terminal Device (Client Side)

Configuration of Log Collection Terminal Device

Figure 2:
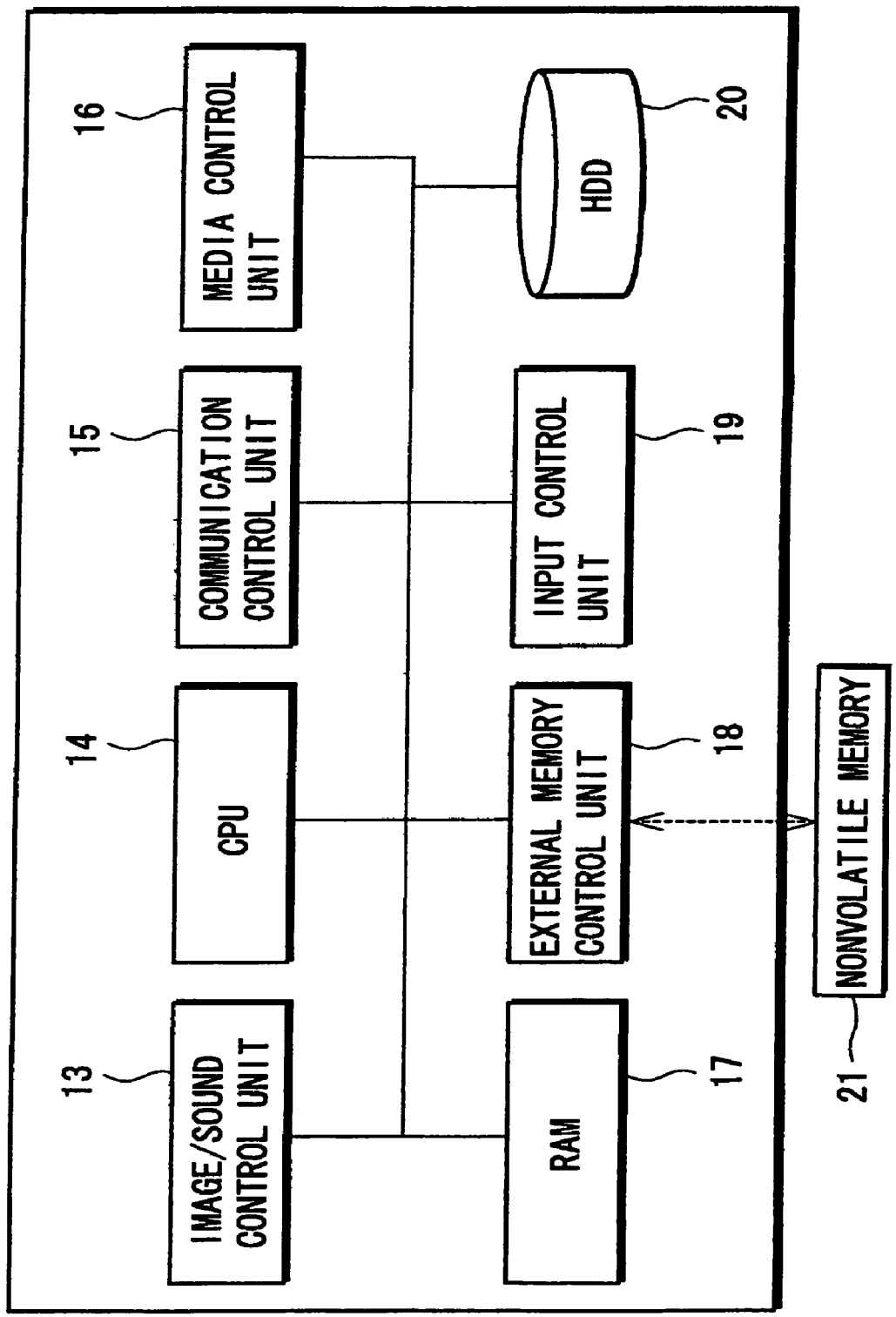
FIG. 2 is a block diagram illustrating a configuration example of a log collection terminal device.

The following describes the configuration of the log collection terminal devices 1 to 4. FIG. 2 illustrates the internal configuration of one log collection terminal device. The log collection terminal device comprises image/sound control unit 13, CPU (central calculation processing unit) 14, communication control unit 15, media control unit 16, RAM 17, external memory control unit 18, input control unit 19, and HDD (magnetic recording medium) 20 as principal configuration elements, in which these respective elements are connected with each other via a bus.

The image/sound control unit 13 controls the image output to a monitor unit that is not illustrated and the voice output to a speaker and so forth, or the input from a video camera and a microphone. The CPU 14 controls the total operation of the log collection terminal device. The communication control unit 15 that is connected to the network 5 illustrated in FIG. 1 controls communications executed between the communication control unit 15 and the network 5. The media control unit 16 controls a media drive which is not illustrated, in that the media control unit 16 inputs therein signals from external recording media such as a CD-ROM and/or a DVD-ROM and so forth loaded in the media drive, or the media control unit 16 writes signals to the external recording media.

The HDD 20 records various kinds of programs for realizing the log collection processing of the present embodiment and/or various kinds of data. The RAM 17 stores therein a program read out from the HDD 20 and/or data utilized during execution of various kinds of processing. The external memory control unit 18 is connected to nonvolatile memory 21 existing at an external part of the log collection terminal device. The external memory unit 18 controls the transmission/reception of the data as well as the write/read of the data between the external memory control unit 18 and the memory 21. The input control unit 19 controls user interface input units, such as a keyboard, mouse, and so forth that are not illustrated.

Figure 3:
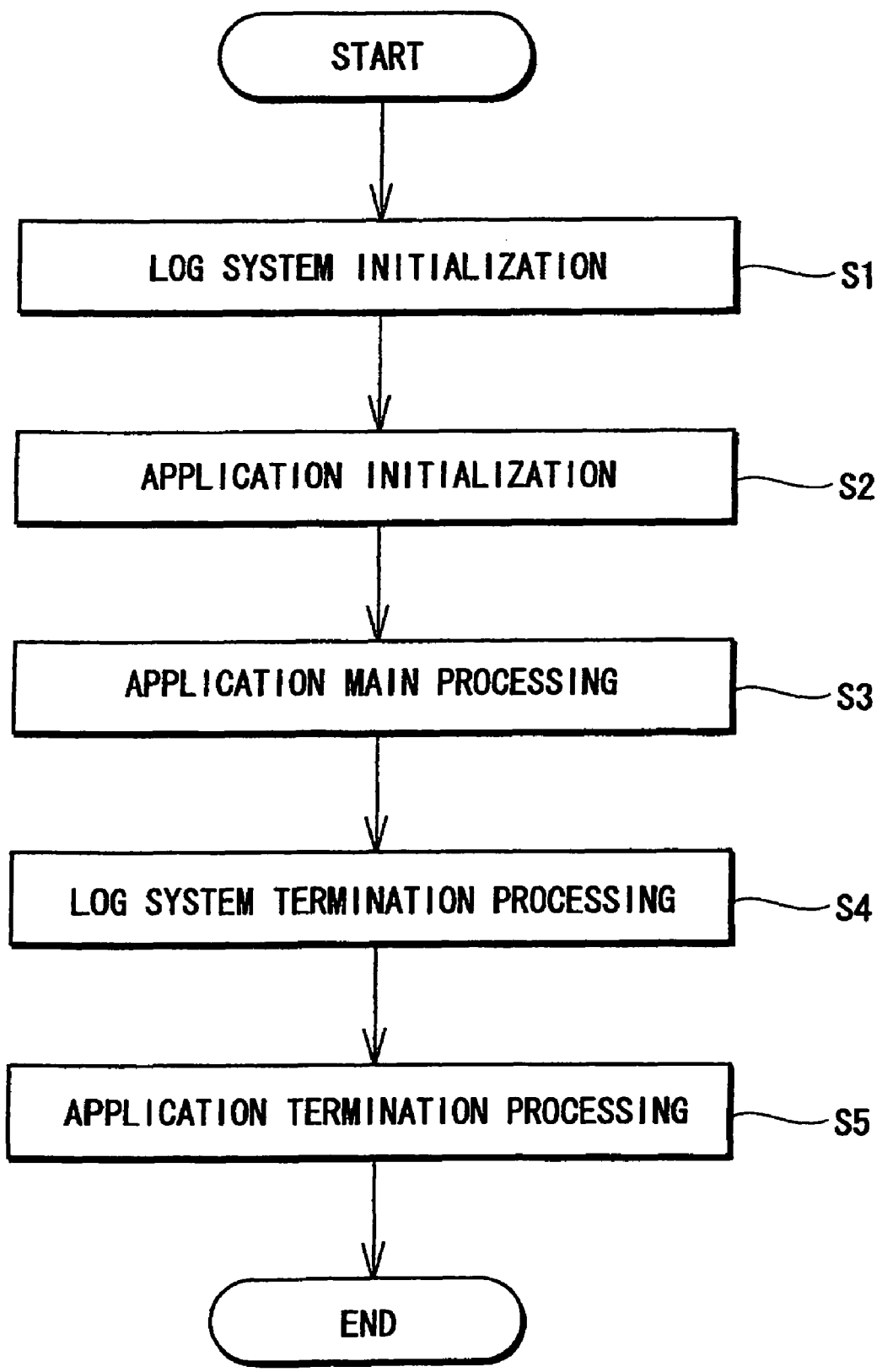
FIG. 3 is a flowchart illustrating the flow of log system processing at the log collection terminal device.

Flow of Processing at the Time of Log System Utilization According to the Log Collection Terminal Device The flow of processing (principally, processing of an application part according to the present invention) at the log collection terminal device will be explained using FIG. 3. It should be noted that the processing illustrated in FIG. 3 is mainly achieved by the function of the CPU mounted in the log collection terminal device. First, as the processing of STEP S1, the log collection terminal device initializes the log collecting/analyzing system illustrated FIG. 1 in order to permit utilization of the log collecting/analyzing system. In this initialization, determinations are made in which the log collection terminal device ascertains the log user in order to use the log collecting/analyzing system, the log collection terminal device determines whether it is capable of using the log collecting/analyzing system, and so forth. When the processing in the log collection terminal device is completed, initialization of the application is executed as the processing of STEP S2.

When the initialization of the application is completed, the log collection terminal device provides main processing (application main processing) of the application as the processing of STEP S3. It should be noted that the application main processing will be described later. Then, the log collection terminal device, when the application main processing is completed, executes processing to terminate utilization of the log collecting/analyzing system as the processing of STEP S4. According to this termination processing, the log collection terminal device stores the log information maintained in the RAM 17 for the sake of the log collecting/analyzing system in the HDD 20 and so forth. Further, the log collection terminal device releases resources that are used for the log collecting/analyzing system. After that, the log collection terminal device conducts termination processing of the application of the present embodiment as the processing of STEP S5. After that, the log collection terminal devices 1 to 4 are in a condition in which they are capable of being terminated.

Figure 4:
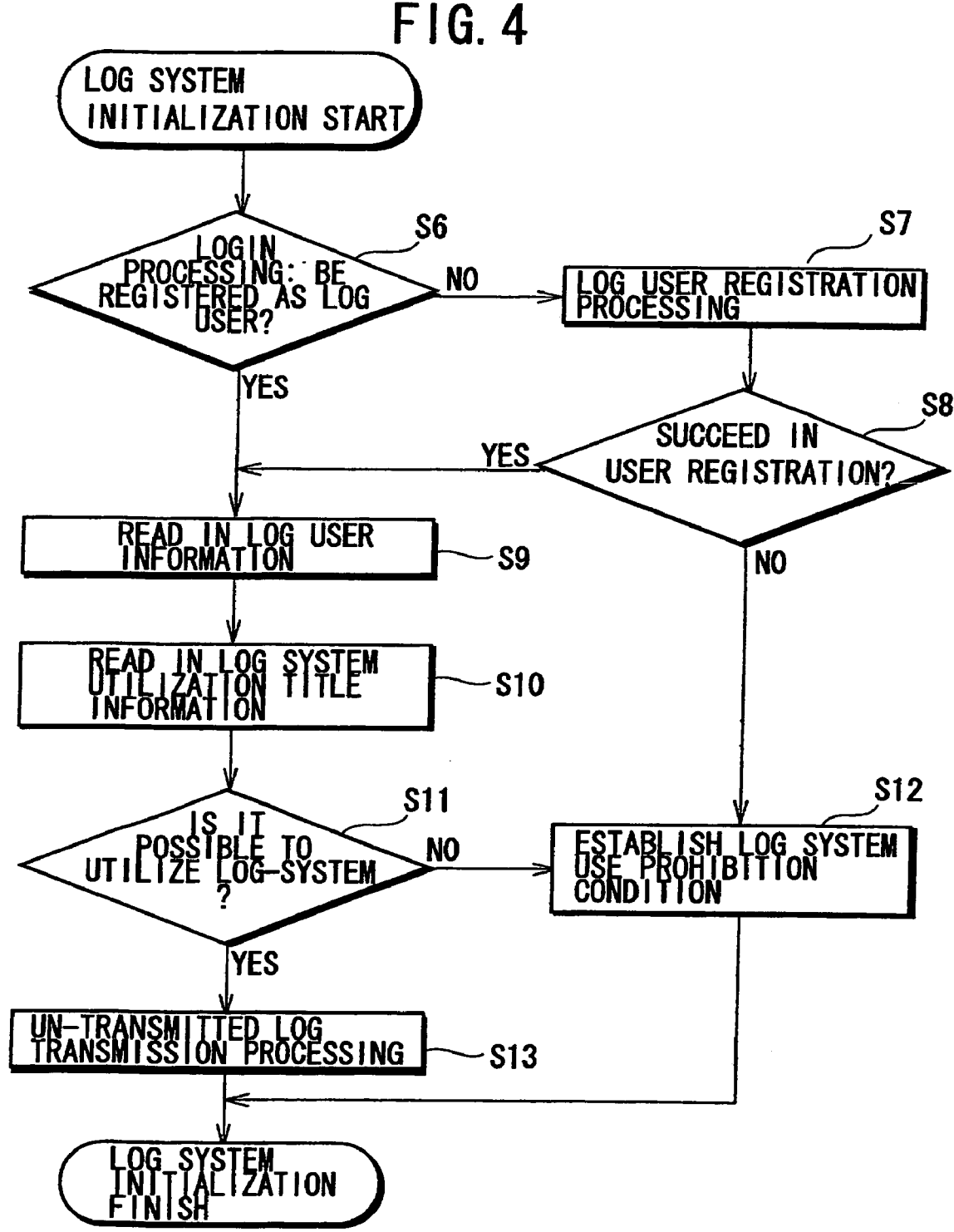
FIG. 4 is a flowchart illustrating the flow of initialization of a log system.

Initialization of the Log Collection Terminal Device for the Use of the Log Collecting/Analyzing System The following describes details of the processing to enable utilization of the log collecting/analyzing system as conducted in STEP S1 of FIG. 3. FIG. 4 illustrates a flowchart for initialization processing of the log collection terminal device to enable utilization of the log collecting/analyzing system. First, the log collection terminal device conducts login processing of the log user as the processing of STEP S6. This login processing is necessary processing for identifying the user who is using the log collecting/analyzing system, and the processing provides information concerning the user so that the user is identified.

In the identification processing of STEP S6, when the user is not registered as a log user, log user registration processing is conducted in the processing of STEP S7. In this registration processing, the log collection analysis terminal device, to determine whether double registration of the user is being conducted, compares information registered beforehand with information input by the log user registration whether the user is an unfair user, and so forth. Then, in the processing of STEP S8, when user registration has been successful, the log collection terminal device continues log system initialization. In the processing of STEP S8, if the user registration is not made for some reason, the log collection terminal device interrupts the log system initialization and sets the log system in a use prohibition condition in the processing of STEP S12. Thereafter, the log collection terminal device concludes the log system initialization.

On the other hand, in the processing of STEP S8, when registration as a log user is successful, the log collection terminal device inputs therein log user information stored in, for instance, the HDD 20 and/or the nonvolatile memory 21 as the processing of STEP S9. Further, the log collection terminal device inputs therein log system utilization title information as the processing of STEP S10.

Then, the log collection terminal device determines whether the log system can be utilized as the processing of STEP S11. It should be noted that this determination is conducted to control the period of using the log system. For instance, in cases where certain log service is established so as to provide service for only one month, if, for instance, the service period of the log collecting/analyzing system has been concluded, it is no longer possible to transmit the log to the log server 7. Therefore, the log collection terminal device determines whether the log collecting/analyzing system may be used in order to forestall the occurrence of such condition.

When it is determined in STEP S11 that the log collecting/analyzing system cannot be utilized, the operation of the log collection terminal device proceeds to processing of STEP S12, in which the log system is set in the use prohibition condition. This use prohibition condition is one in which the log collection terminal device overrides the recording of the log in the log collecting/analyzing system, and the function of transmitting the log to the log server 7, and so forth. Thus, when the log collecting/analyzing system is set to the use prohibition condition, an application that employs the log collecting/analyzing system is capable of executing processing in the same way as during normal functioning regardless of whether the log collecting/analyzing system is effective or ineffective. However, the specific processing to record logs and/or transmit logs is not executed. Namely, the log collection terminal device realizes control of the use prohibition condition in such a way as to internally control whether the processing to record logs and to transmit logs is affected.

On the other hand, when it is determined that the log collecting/analyzing system is capable of being used at STEP S11, the log collection terminal device executes transmission processing of logs that have not yet been transmitted as the processing of STEP S13.

The present invention is characterized in that it is possible to realize the function of collecting logs in an off-line environment. The processing of STEP S13 relates to the function of collecting logs in an off-line environment. Namely, when the log collection terminal device is always connected to the network 5, it is possible to process surely the transmission of a log to the log server 7, while when the network 5 is interrupted, or when it is not possible to transmit log information to the log server 7 because of some kind of obstacle, the log collection terminal device stores the log information temporarily, and then transmits the log again when the network 5 or the log server 7 is restored to a normal condition. The processing of STEP S13 is one in which the retransmission function is realized.

Record of Log User Information

Next, information registered as log user information and the registered position thereof are explained.

If the log user information is recorded in nonvolatile recording media on the log collection terminal device, any recording position is permitted. For instance, it is possible to record the log user information in the nonvolatile memory 21 or the HDD 20 illustrated in FIG. 2, or on writable media controlled by the media control unit 16. However, when convenience and/or confidentiality are taken into consideration, recording in the nonvolatile memory 21 is desirable because information recorded in a nonvolatile memory may be easily utilized for login processing at another log collection terminal device. It is assumed in the present embodiment that the log user information is recorded in the nonvolatile memory 21. In the present embodiment, each user is assigned a nonvolatile memory 21 and each user uses the nonvolatile memory 21, whereby the log collection terminal device is capable of identifying respective log users.

Figure 5:
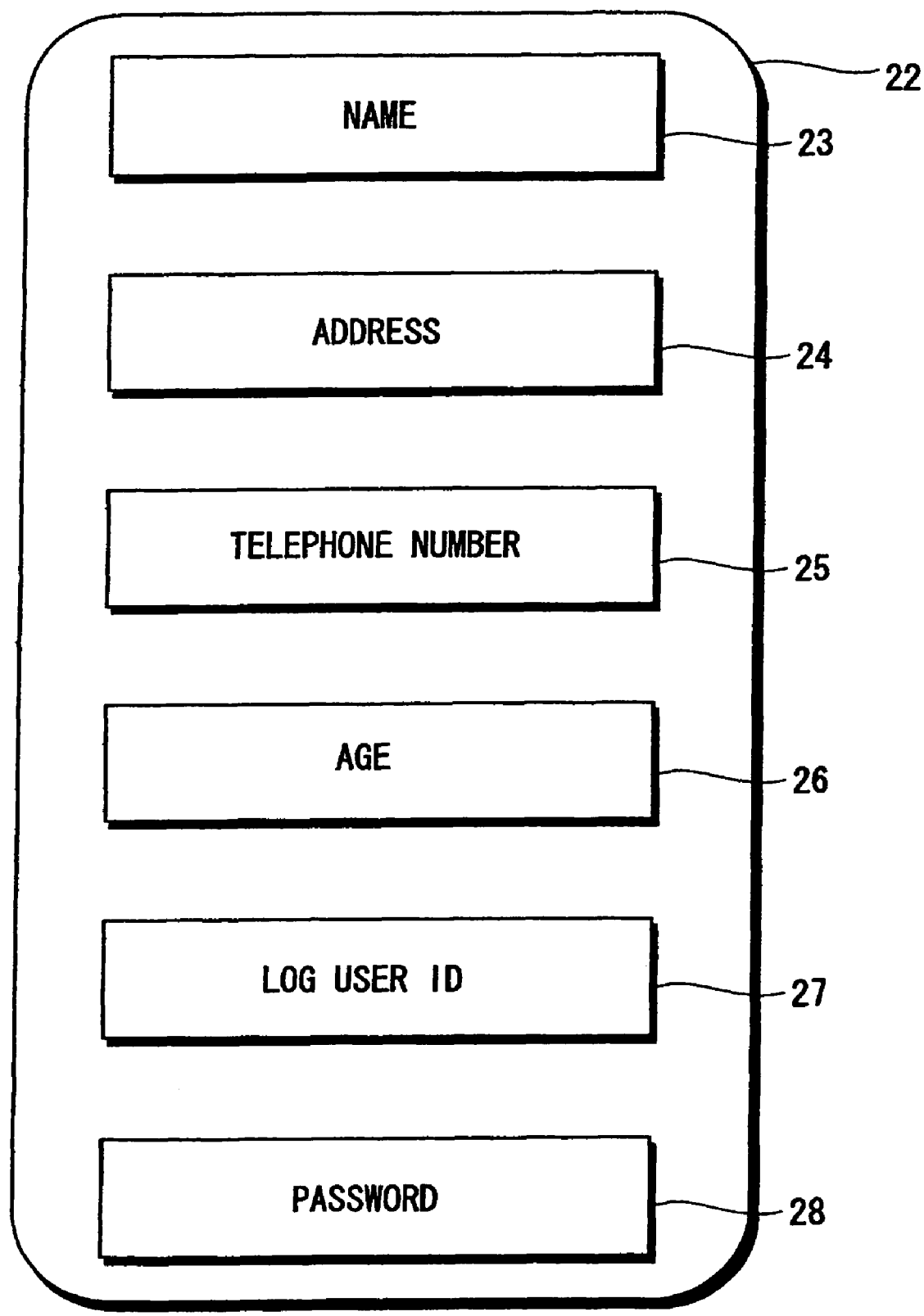
FIG. 5 is a view illustrating one example of log user information.

FIG. 5 illustrates one example of log user information 22. The log user information includes, for instance, name 23, address 24, telephone number 25, age 26, log user ID 27, and password 28. The password 28 is one that is established at the time of log user registration. Input of the password 28 is desired when the log user performs login so that it is possible to identify the user as the identical person when the password 28 is correct. It is assumed in the present embodiment that the nonvolatile memory 21 in which the log user information is recorded is used as an authentication card. Hereinafter, the nonvolatile memory 21 is referred to as authentication card 21.

Login Processing

Figure 6:
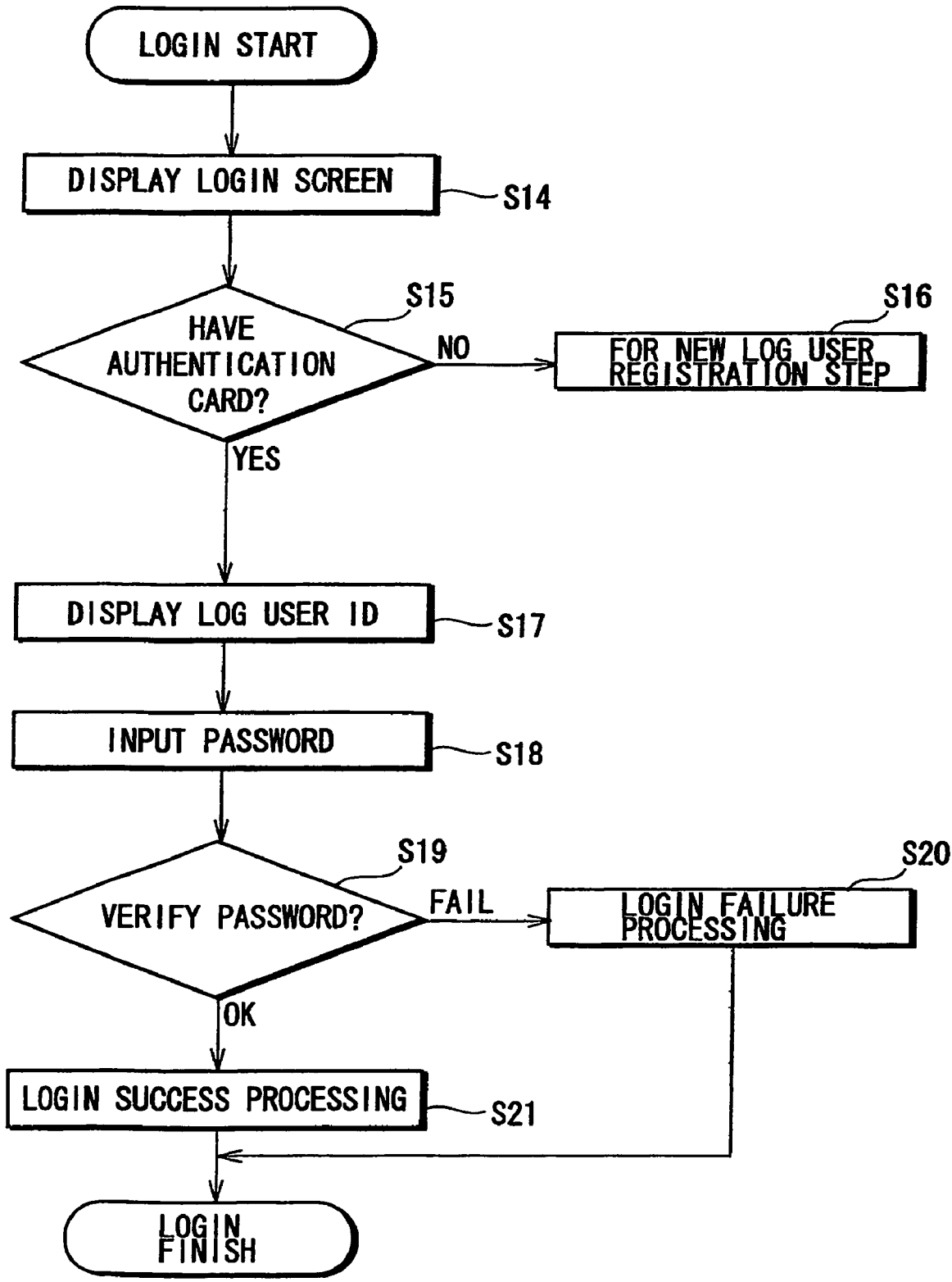
FIG. 6 is a flowchart illustrating login processing.
Figure 7:
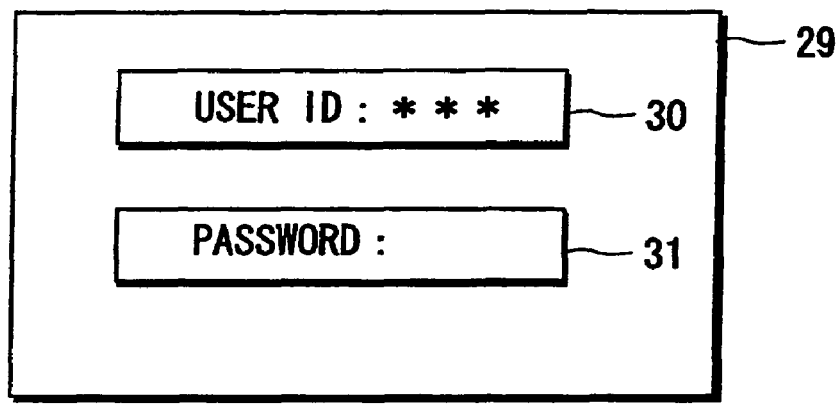
FIG. 7 is a view illustrating a display example of a login screen.

The login processing of STEP S6 illustrated in FIG. 4 will now be explained. A flowchart of this login processing is illustrated in FIG. 6. First, as the processing of STEP S14, the log collection terminal device allows a monitor unit (not illustrated) to display a login screen 29, as illustrated in FIG. 7 for example. The log collection terminal device causes the login screen 29 to display user ID display line 30 and password input line 31. The user ID display line 30 displays the ID that is recorded in the authentication card 21 (nonvolatile memory 21). The password input line 31 is where the log user inputs the password 28.

In addition, the log collection terminal device determines whether the log user has the authentication card 21 at the time of the processing of STEP S14. Namely, the log collection terminal device determines whether the log user has the authentication card 21 by detecting whether the authentication card 21 is connected to the external memory control unit 18, and whether the log user information is recorded within the authentication card 21.

In STEP S15, when the log collection terminal device determines that the log user does not have the authentication card 21, the log collection terminal device regards the log user as a new one, and then moves the processing to the new registration processing of STEP S16. On the other hand, when the log collection terminal device determines that the log user has the authentication card 21 at STEP S15, the log collection terminal device determines that the log user already has been registered as a log user, and then the log collection terminal device moves the processing to the processing of STEP S17. When proceeding to the processing of STEP S17, the log collection terminal device inputs therein the log user ID 27 from the authentication card 21 and then causes the log user ID 27 to be displayed on the user ID display line 30.

Next, the log collection terminal device, in STEP S18, takes in the password 28 input by the log user. The log collection terminal device then verifies the password 28 in STEP S19. It should be noted that the password 28 is input via an input unit, such as a keyboard and so forth. When the result of verifying the password 28 in STEP S19 is that the password input by the log user does not agree with the registered password, the log collection terminal device causes the processing to move to the processing of STEP S20 in which login failure processing is conducted. In this login failure processing, it is possible to request input of the password 28 again or it is possible to simply terminate processing as a login failure. It should be noted that it is assumed in the present embodiment that the login is terminated as a result of the login failure processing of STEP S20.

When the result of verifying the password 28 in STEP S19 is that the password input by the log user agrees with the registered password, the log collection terminal device determines that user authentication is completed, and then executes login success processing as the processing of STEP S21. After that, the log collection terminal device terminates the login processing. It should be noted that in the login success processing in STEP S21, for instance, a screen indicating success in login and so forth may be displayed.

System Configuration of a Log Collection Terminal Device

Figure 8:
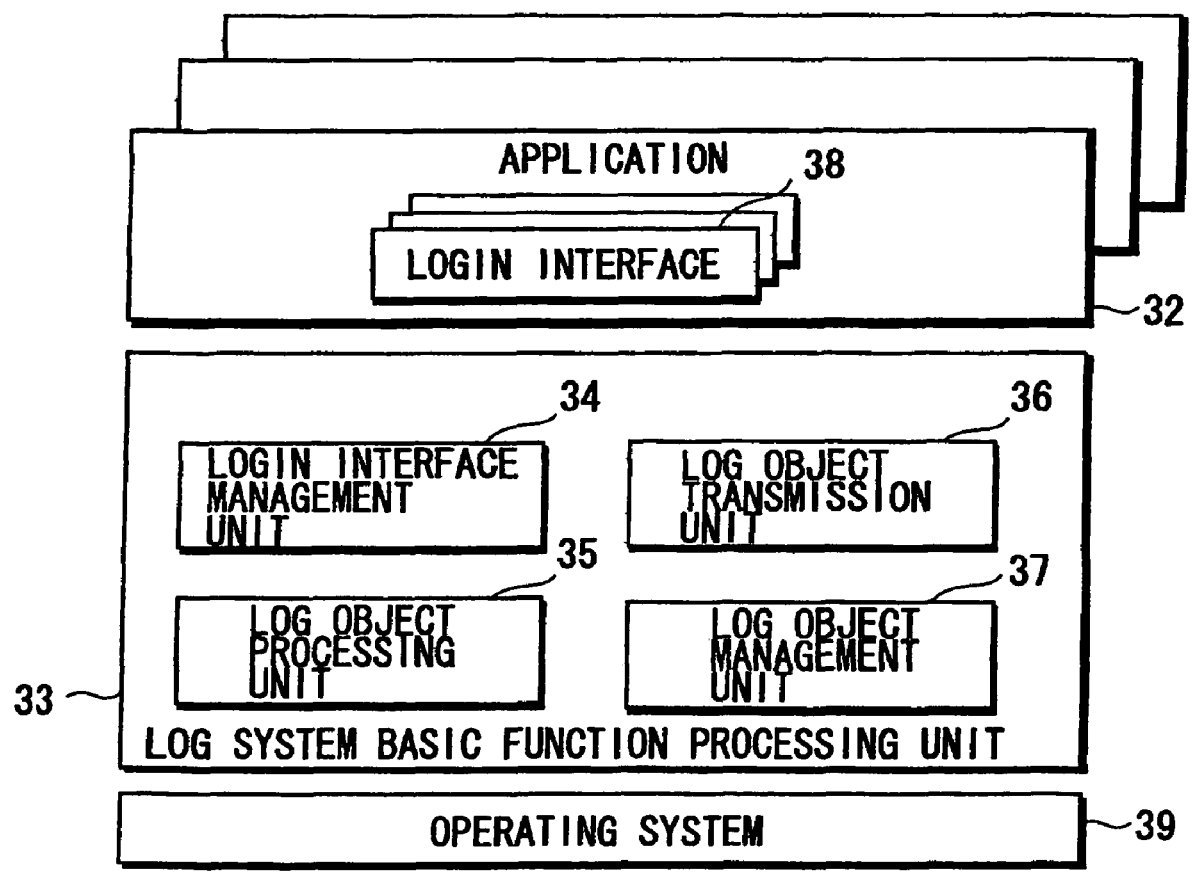
FIG. 8 is a view illustrating the configuration of a log system at the side of the log collection terminal device for log collection.

FIG. 8 illustrates the connection of programs for realizing log collection and log transmission in the log collection terminal device. In the present embodiment, there is provided a login interface having a function for forming the basic structure of the log and a function for generating desired log information from the basic structure of the log which the login interface constructs hierarchically. The hierarchically constructed log information is then transmitted to the log server 7. Alternatively, the log information may be independently managed in every application program.

The program illustrated in FIG. 8 comprises an application 32 for utilizing the log system, a log system basic function processing unit 33 for providing the basic functions of the log collecting/analyzing system and an operating system 39 for operating the log collecting/analyzing system, in which the upper side and lower side relationship illustrated in FIG. 8 means that the function positioned at an upper order utilizes the function of a lower order.

The log system basic function processing unit 33 is separated into several processing units. Login interface management unit 34 manages a login interface 38. The login interface 38, which is independently defined by the log collection service utilizing companies 9 to 12 for utilizing collected log information, executes processing for outputting a log that is specialized in accordance with the respective log service. When the application 32 requires the login interface 38, the login interface management unit 34 is initialized to provide the desired login interface 38.

Log object processing unit 35 is a unit for controlling the function of the log object as being basics of the log. Log object transmission unit 36 is a unit for controlling the processing to transmit log information to the log server 7. Log object management unit 37 is a unit for managing the log itself, such as a storage area of the log object, elimination processing thereof and so forth. For instance, when executing storage of logs, the log object management unit 37 specifies an appropriate position for the storage. Also, on the occasion of eliminating an unnecessary log, the log object management unit 37 controls the elimination.

Configuration of a Log Object

Figure 9:
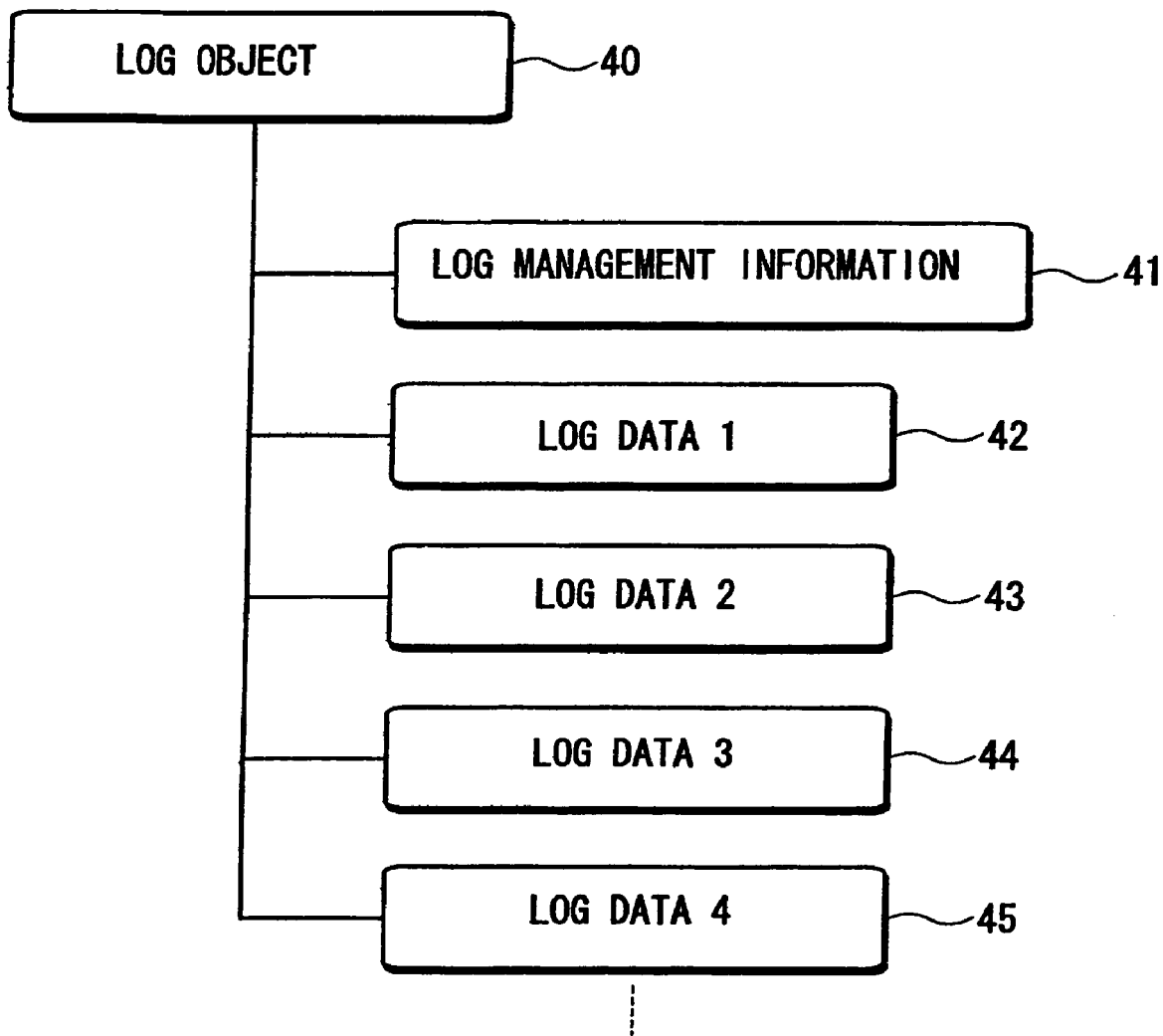
FIG. 9 is a view illustrating the configuration of a log object.

FIG. 9 illustrates the configuration of log object 40. Log object 40 is composed of log management information 41 and log data 1 to 4 (42 to 45). The log management information 41 is where information on the background of the log object 40 is recorded. The log data 1 to 4 (42 to 45) are where specific log information generated by the login interface 38 is recorded. The log object 40 may include a larger amount of log data. It should be noted that FIG. 9 illustrates one example thereof.

Figure 10:
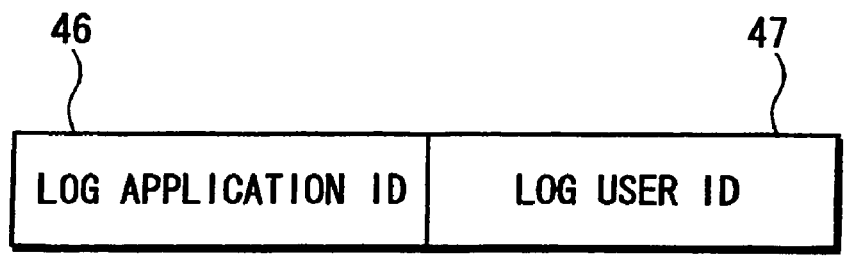
FIG. 10 is a view illustrating the internal structure of management information of a log.

FIG. 10 illustrates the internal configuration of the log management information 41. The log management information 41 is composed of log application ID 46 and log user ID 47. The log application ID 46 is identification information that is utilized to control the use of the log collecting/analyzing system. In addition, the log user ID 47 indicates identification information utilized to indicate which user the log belongs to.

Figure 11:
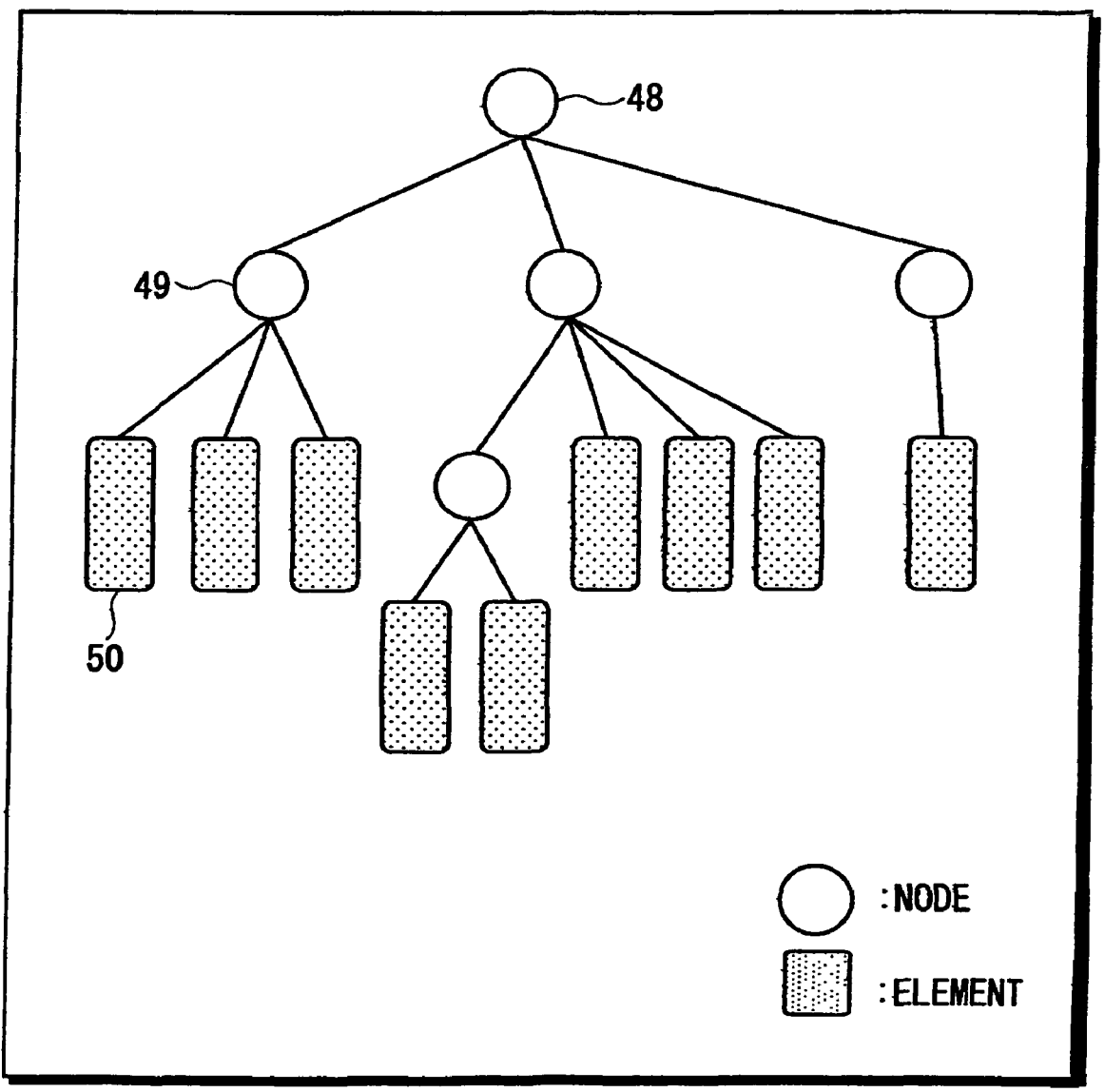
FIG. 11 is a chart illustrating the tree structure of a configuration example of log data 1.

Next, the configuration of the log data 1 to 4 (42 to 45) is explained using the example of FIG. 11. FIG. 11 illustrates the configuration of the log data 1 (42) which is divided into nodes and elements having a tree structure. The node is capable of including nodes or elements. It should be noted that the node cannot be utilized as a terminal device. On the other hand, the element is capable of being utilized as a terminal device and capable of including arbitrary data. The node 48 is a root node, and the front of the log data refers to the front node of the root node 48. The node 49 includes element 50 at a lower position.

The log data 1 to 4 (42 to 45) are capable of adopting an arbitrary log structure as a result of managing the tree structure. Here, in the present embodiment, XML (eXtensible Markup Language) is utilized as the specification for defining this tree structure. FIG. 12 illustrates one example thereof. This FIG. 12 illustrates an example in which is recorded a selected play mode and the number of utilization of the play mode in a certain application such as a video game and so forth. The tag <playDate> in FIG. 12 indicates data as to when the user takes the log, and the tag <mode> records the play mode name that is used in this case (indicated by the tag <name>) and the number of uses thereof (indicated by the tag <selectedTimes>). This example indicates that the record is one in which PracticeMode is used three times at 2000, 12, When extracting data from this log data, it is possible to retrieve desired data by following the tag. Here, FIG. 13 illustrates an example of the case in which the log object illustrated in FIG. 9 is expressed as XML. In the example of FIG. 13, <info> tag 51 describes both the log application ID (hereinafter referred to as log appli. ID 46) for indicating the log application program (hereinafter referred to as the log appli.) that generates the log object and the log user ID 47 indicating the user to become the object of the log.

In addition, the log related to the login interface is described in <DATA> tag 52. That is, the <DATA> tag 52 illustrated in FIG. 13 describes that this tag is one which is generated by the login interface indicated by interface ID1. Further, the inside of the <DATA> tag 52 describes the log itself constituted by the login interface indicated by the interface ID1. The shape of the <DATA> tag 52 at this time is like the one illustrated in FIG. 11. Accordingly, if these tags are followed, it is possible to retrieve desired data. It should be noted that these IDs are utilized in order to homologize the analysis interface used on the occasion that the analysis of the log is executed onto the log at the log server 7 later.

Relationship Between Login Interface and Service

The tree structure of the log illustrated in FIG. 11 is also capable of being output directly from respective applications. However, when preparing such configuration in every application, there may be problems that programs for forming the tree structure are redundant. In addition, since pre-arrangements for recording the log are large, development efficiency decreases. Since the development of programs for forming the tree structure in every respective application causes bad efficiency, the present embodiment enhances development efficiency of the application by providing programs for forming the tree structure as a library.

In order to solve the above object, the present invention separates functions such as preparation, storage and so forth of basic structures of the log as basic functions, further designing and mounting specific recorded parts of the log at the application side that utilizes its basic function as a login interface, whereby the present invention realizes an effective log collecting/analyzing system capable of flexibly coping with various kinds of uses.

That is, in the present embodiment, the login interface 38 illustrated in FIG. 8 provides the above-described log data 1 to 4. The login interface 38 described in the present embodiment is a program that is designed and mounted in order to collect and record logs, in which the login interface 38 functions as an API (Application Programming Interface) between the application 32 illustrated in FIG. 8 and the log system basic function processing unit 33. This library with the login interface 38 mounted allows a log basic library for preparing a basic tree structure on the inside thereof to access, in which the log basic library outputs the result and receives in accordance with a determined format. In addition, the log basic library hierarchically constructs the log and then designs and loads a specialized log for the application program.

Here, the login interface 38 is specifically designed depending on the necessary log contents, and one example thereof is illustrated in FIG. 14. In the login interface 38 illustrated in FIG. 14, API 53 is one in which the date of use is recorded. At the side of the application 32, it is possible to generate the <PlayDate> tag by accessing this API 53. In addition, it is possible for the application 32 to prepare the <mode> tag and the following structure bodies by accessing the API 53. It should be noted that, as for the API 54, device is slightly added in this mounting in that, when a mode with the same name is used, 1 is added to the record of the number of times of use. Thus, according to the mounting of the login interface 38 of the present embodiment, the side of the application 32 can manage data desired to be recorded, and also the side of the login interface 38 is capable of managing the data desired to be recorded. Thus, any of them is capable of recording necessary data.

Next, the storage method of the above-described log object including logs will be described using FIG. 15. Log objects are recorded in a nonvolatile storage area such as HDD20, a flash memory and so forth. In the present embodiment, log objects are recorded in authentication card 21. In addition, the log object is managed in every application unit in which the log object is used. Namely, the log object is managed in its storage area in every application with the shape of title 1, title 2, . . . illustrated in FIG. 15, in which the logs are registered to those respective areas. For instance, log storage area 55 illustrated in FIG. 15 is managed for the sake of application of title 1, and log 56 is registered to the area 55 in that the application utilizes the log 56.

Figure 15:
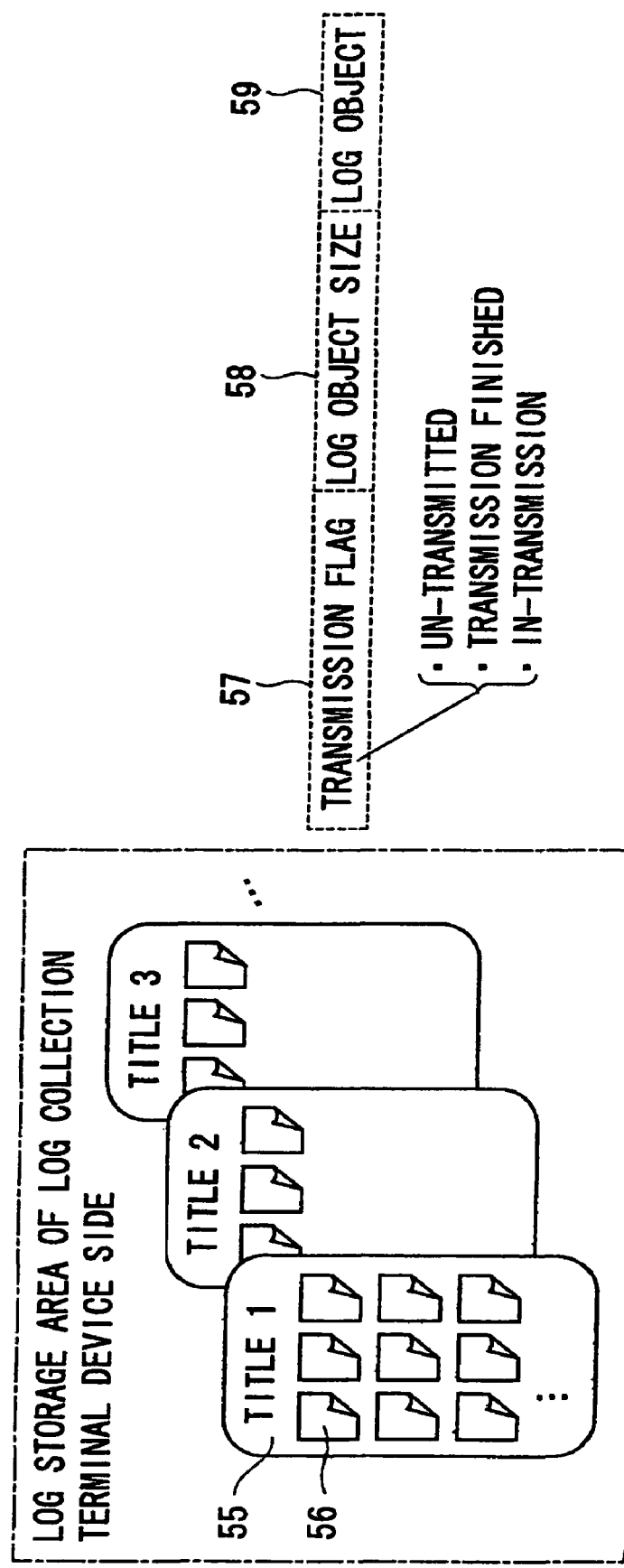
FIG. 15 is a view illustrating a method of storing a log object.

The log object is stored with a structure as illustrated on the right side of FIG. 15. Namely, the log object consists of a transmission flag 57, a log object size 58 and a log object 59. The transmission flag 57 records conditions when transmitting logs to the log server 7. Thus, the transmission flag 57 has three conditions of, for instance, un-transmitted, finished transmission and in transmission. The un-transmitted condition means that the log has not yet been transmitted to the log server. The finished transmission condition means that the log has already been transmitted to the log server 7. The in transmission condition means that transmission of the log to the log server 7 has not been completed as a result of some interruption of the transmission in the last time transmission of the log. When transmitting the logs, the un-transmitted log or the in transmission log is transmitted to the log server 7. In addition, the log storage area 55 increases to accumulate the logs. However, it is possible to remove the logs which have finished transmission. For this reason, memory areas such as HDD 20, flash memory and so forth are not pressured.

Termination Processing of the Log System

Next, termination processing at the side of the log collection terminal device will be explained. In the side of the log collection terminal device, when an application is made to terminate, first, it is necessary to terminate utilization of the log collecting/analyzing system. This processing is necessary in order to record the log without contradiction. For this reason, the log collection terminal device allows utilization termination processing of the log collecting/analyzing system to execute (the processing of STEP S4 illustrated in FIG. 3) before the termination processing of the application (the processing of STEP S5 in FIG. 3). Specifically, the log collection terminal device forcibly stores therein the log object in use, and/or executes use termination processing of the log storage area, and so forth in safety. The log collection terminal device subsequently executes termination processing of the log application itself at STEP S5, and thus terminates operation of the log collection terminal device itself.

Log Server (Server Side)

Configuration of the Log Server

Figure 16:
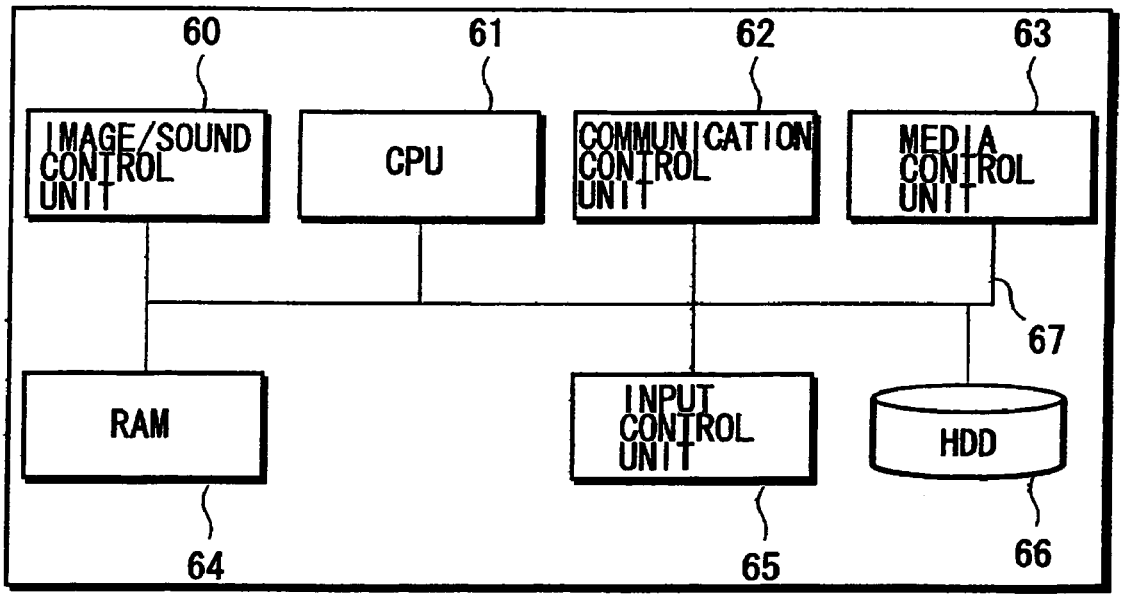
FIG. 16 is a block diagram illustrating a configuration example of a log server.

The configuration of the log server 7 side will now be explained. The log server 7, as illustrated in FIG. 16, is composed of image/sound control unit 60, CPU 61, communication control unit 62, media control unit 63, RAM 64, input control unit 65 and HDD 66 as the principal configuration elements. These elements are all connected to one another via bus 67.

The image/sound control unit 60 controls image output for a monitor unit that is not illustrated and voice output for a speaker and so forth, or controls inputs from a video camera and a microphone. The CPU 61 controls programs on the log server 7 and/or controls equipment connected via bus 67. The communication control unit 62 is connected to the networks 5, 8 illustrated in FIG. 1 and controls communication executed between the networks 5 and 8 and another part, receives the logs and so forth. The media control unit 63 controls a media drive that is not illustrated, and inputs the signals from external media such as a CD-ROM, DVD and so forth loaded in the media drive. In addition, the media control unit 63 allows signal writing and so forth to external media, such as a CD-RW and so forth. The RAM 64 is a unit for storing programs, data and so forth for operating at the log server 7. The input control unit 65 controls user interface input units at the log server 7, such as a keyboard or mouse that are not illustrated. The HDD 66 is a large capacity storage area for recording log information managed at the log server 7 and/or for recording an analyzed result and so forth.

System Configuration of the Log Server

Figure 17:
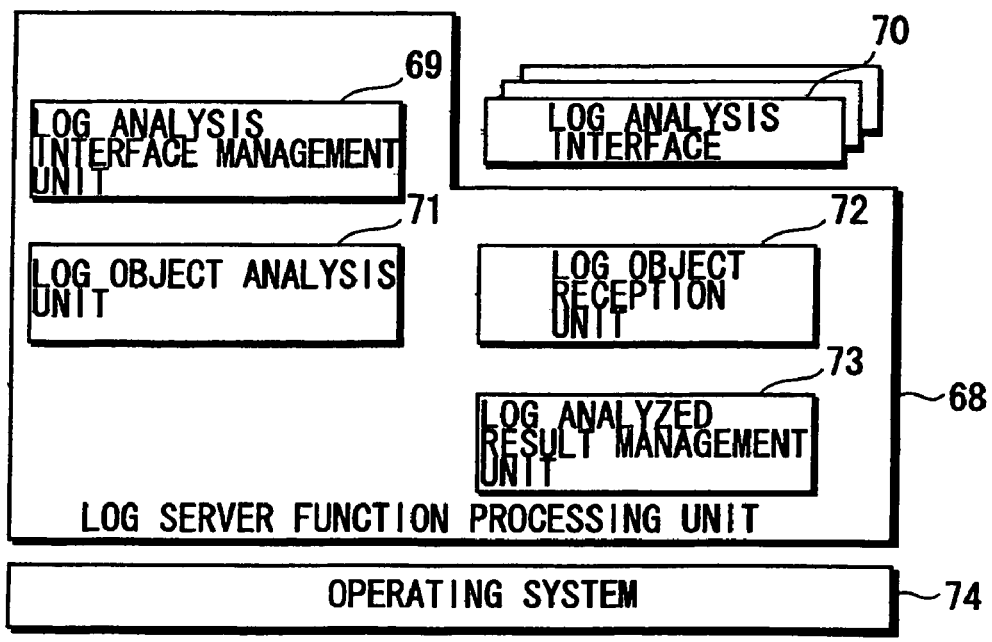
FIG. 17 is a view illustrating the configuration of a log system at the side of the log server.

Next, FIG. 17 illustrates in outline form the configuration of a program for performing reception-analysis of logs in the log server 7. In the present embodiment, the log server independently manages log information received from the log collection terminal device for each individual application program, and pulls out necessary information from the log information to analyze. After that, the log server stores the analyzed result in a desired form.

The program illustrated in FIG. 17 is mainly provided with an operating system 74, a log server function processing unit 68 and a log analysis interface 70, and the relationship between upper and lower in the drawing means that an upper rank section utilizes the function of a lower rank section. The log server function processing unit 68 is composed of a log analysis interface management unit 69, a log object analysis unit 71, a log object reception unit 72 and a log analyzed result management unit 73.

The log analysis interface management unit 69 manages the log analysis interface 70. That is, the log server 7 is capable of pulling out the log analysis interface 70 necessary for analysis in such a way as to go through the log analysis interface management unit 69. The log analysis interface 70 is an interface for analyzing log information received from the log collection terminal device. Such log analysis interface 70 is designed and mounted with a form corresponding to the login interface 38 used at the log collection terminal device side.

The log object analysis unit 71 analyzes logs received by the log server 7. The log object reception unit 72 controls the function of receiving logs transmitted from the log collection terminal device. The log analyzed result management unit 73 stores therein the results of the analysis performed in the log object analysis unit 71. In addition, the log analyzed result management unit 73 provides the result of analysis to the log collection service utilizing companies 9 to 12.

Log Management Database

The above-described log server 7 receives the above-described log and allows databases to be prepared in order to store and manage the results of the analysis performed by the log server 7. In the present embodiment, a log management database, a log storage database and a log analyzed result management database are prepared. FIG. 18 to FIG. 23 illustrate configurations of these databases. It should be noted that these databases are managed in the log storage area 6 illustrated in FIG. 1.

Figure 18:
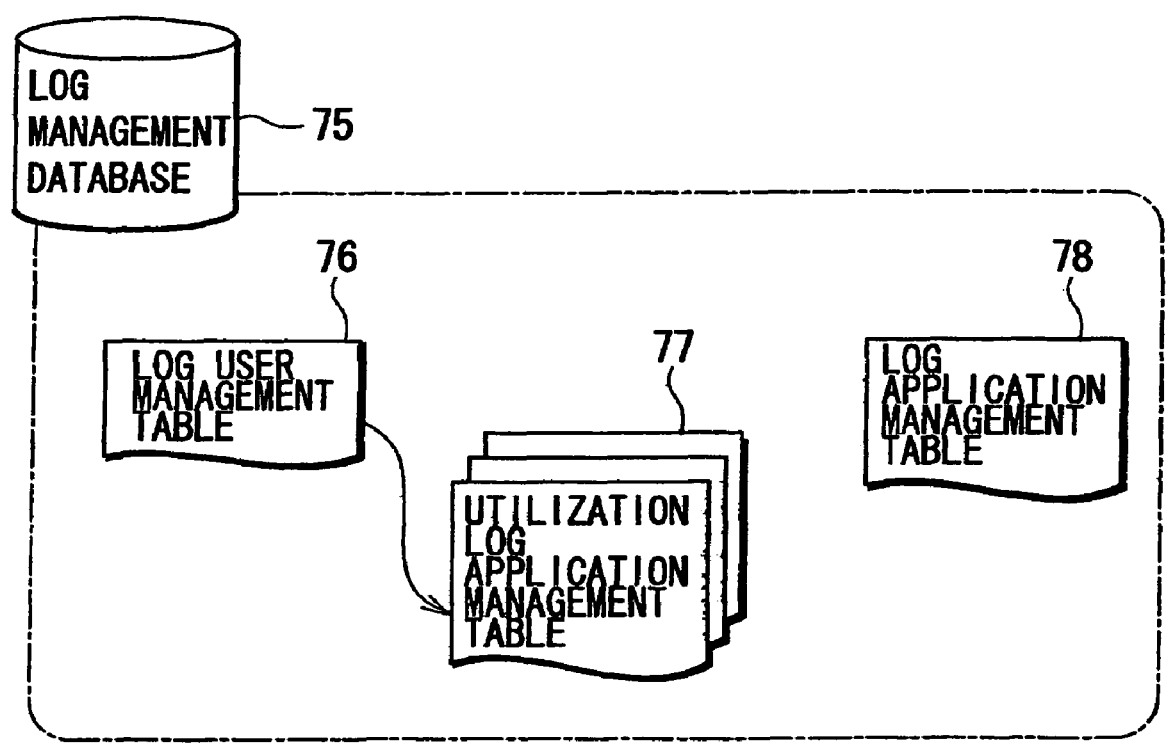
FIG. 18 is a view illustrating the configuration of a management database of a log.

FIG. 18 illustrates in outline form the configuration of the log management database. The log management database is composed of a log user management table 76, a utilization log application management table 77 and a log application management table 78.

The log user management table 76 manages information of users subjected to log service. The contents of this table include the log user ID, name, age, address, telephone number, log storage table name and utilization log application management table name, as illustrated in the log user management table 76 of FIG. 19A. Since such name, age, address, telephone number and so forth are one example of the table contents, when detailed information including personal information is desired, it is possible to handle such situations by increasing the items in the table, if necessary. Log user information in the log user management table 76 is prepared by a new log user registration. For instance, the new log user registration processing in STEP S16 illustrated in FIG. 6 provides the log user information.

The log storage table name is where the log is specified as being stored when the log server 7 receives the log. The log is stored and managed for every log user. The log management information of the log object illustrated in FIG. 10 is utilized here. The log appli. ID described in the log object is used to classify the log application. In addition, the log user ID is used in order to classify the log users.

The utilization log application management table name specifies the utilization log application management table 77 in order to manage the log application being used by the user. The utilization log application management table 77 is composed of the log appli. ID and the final log reception date and time, as illustrated in FIG. 19B. The utilization log application management table 77 is prepared for every log user, and the utilization log application management table 77 manages information regarding which log application has been used by the log user. Accordingly, it is possible to immediately know which log application has been used by a log user by referring to this table.

The log application management table 78 manages the log applications executing the log service. The configuration of the log application management table 78 is illustrated in FIG. 19C. The log application management table 78 is composed of log appli. ID, licensee name, authentication data, log storage table name, the number of analysis table, the log analyzed result management table name and an in-service flag. The log appli. ID is a number unique to each application that uses the log collecting/analyzing system. The licensee name indicates the person who prepares the log application or the company name thereof. The authentication data is utilized in order to ascertain other persons who, on occasion, provide the log. The log storage table name indicates the log storage table for the log application in order to manage the log registered in the log application. The number of analysis table indicates the number of analyzed result tables existing in the result of analyzing by the log application. The log analyzed result management table name manages the table that stores the log analyzed results, and is generated for each log application. The in-service flag controls whether the log application is capable of being utilized. The flag is utilized to indicate service conditions, such as, for instance, that service is already terminated.

Log Storage Database

Figures 20, 21A, 21B:
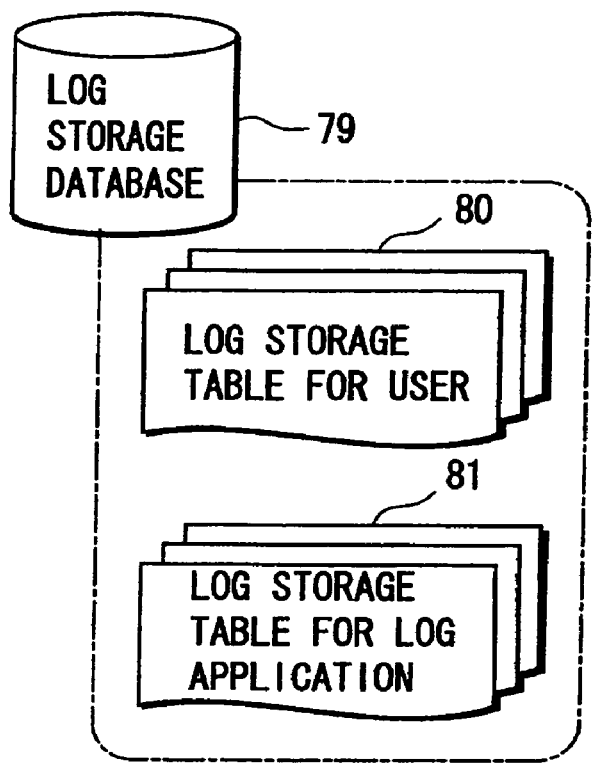
FIG. 20 is a view illustrating the configuration of a log storage database.
FIG. 21A illustrates the configuration of a log storage database: a view illustrating a log storage table for the user.
FIG. 21B illustrates the configuration of a log storage database: a view illustrating a log storage table for a log application.

FIG. 20 illustrates in outline form the configuration of the log storage database 79. The log storage database 79, as illustrated in FIG. 20, is composed of a log storage table for the user 80 and a log storage table for the log application 81. The log storage table for the user 80, when the log user transmits a log to the log server 7, is a position in which the log is stored first. The configuration of the log storage table for the user 80, as illustrated in FIG. 21A, includes a log reception ID, a log reception date and time, a utilization log application ID and logs. The log reception ID is a unique number for every log reception. The log reception date and time is the date and time when the received log is recorded. The utilization log application ID indicates what log application was utilized for a recorded log. Further, the log object itself is recorded in the log shown in FIG. 21A. In the analysis of the log, it is possible to specify which log in the log storage table is to be analyzed by user 80 according to the log reception ID and the log user ID.

The log storage table for log application 81 manages the logs registered in the log application. The log storage table for log application 81 is utilized for analysis of the log. Analysis of the log is executed for every log application. However, the determination of whether a log has been analyzed is made while referring to this log storage table for log application 81. The log storage table for log application 81 is composed of a log reception ID, a log reception date and time, and a log user ID, as illustrated in FIG. 21B.

Log Analyzed Result Management Database

Figure 22:
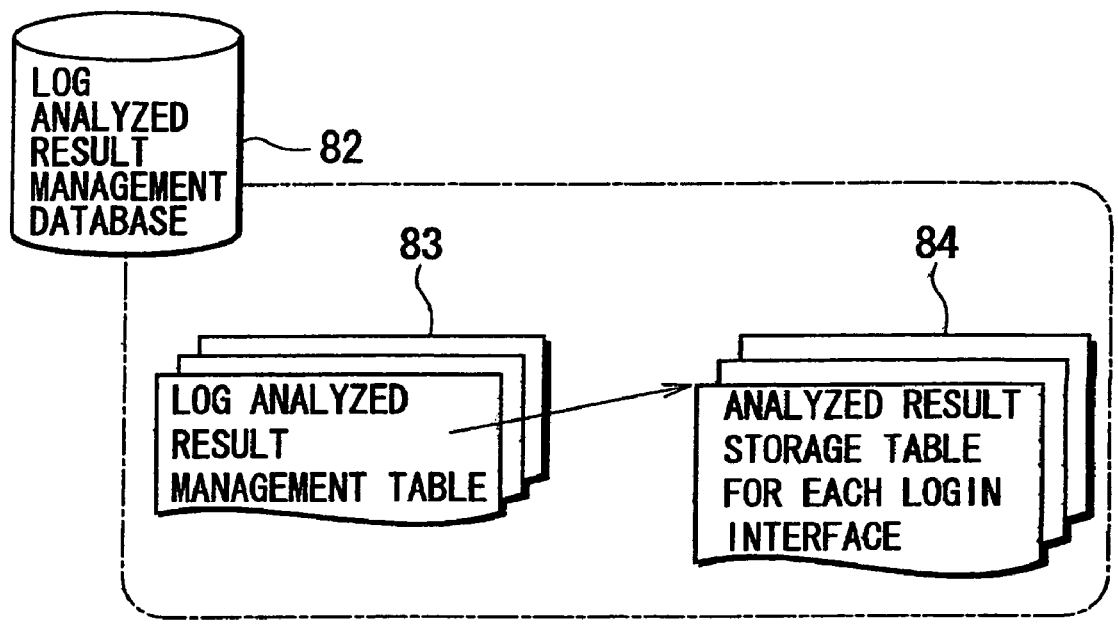
FIG. 22 is a view illustrating the configuration of a management database of a log analyzed result.
Figure 23:
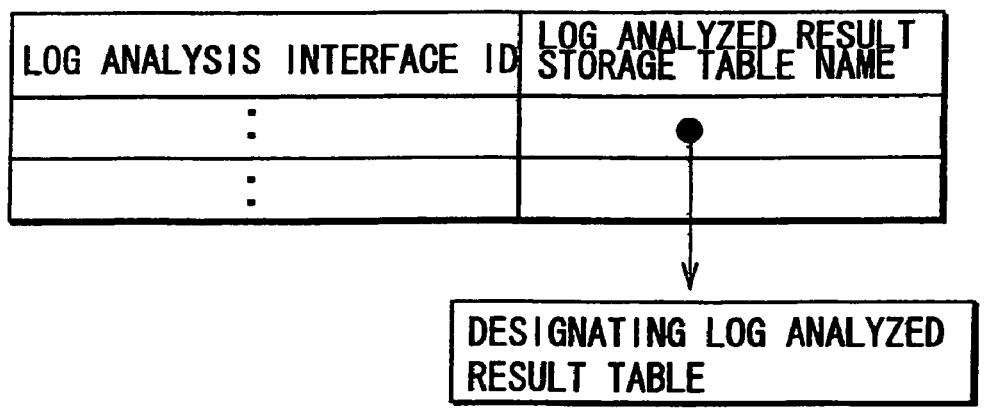
FIG. 23 illustrates the configuration of a management database of a log analyzed result: a view illustrating a management table of a log analyzed result.

FIG. 22 illustrates in outline form the configuration of the log analyzed result management database. The log analyzed result management database 82 is composed of a log analyzed result management table 83 and an analyzed result storage table for each login interface 84. The log analyzed result management table 83, as illustrated in FIG. 23, is composed of a log analysis interface ID and a log analyzed result storage table name. The log analysis interface ID indicates the interface for analyzing the log and corresponds to the ID of the login interface 38 used on the side of the log collection terminal device. The log analysis interface ID is one to which the function for accessing necessary information is mounted, in which necessary information is accessed to be pulled up from the log that is generated by the login interface at the side of the log collection terminal devices 1 to 4.

Here, specifically, the operation of the log analysis interface will be explained by using the example of the log data illustrated in FIG. 12 and the example of the login interface illustrated in FIG. 14. The example describes the case of analysis of the log to determine "Date when play is performed", "which mode is selected", and "the mode is selected how many times". The log analysis interface extracts the first "date of performing play" and "the number of selection of mode" from the log object and then stores the analyzed result in the table illustrated in FIG. 24. This table is composed of the log user ID, date of play and four play modes (practice mode, tournament mode, season mode, customize mode). In play date, the play date illustrated in FIG. 12 is described. In addition, for the four respective play modes, the number of playing times is described. Further, in the log user ID, the log user ID of the user transmitting the log is described. The log analysis interface 70 executes extraction of data, conversion and record processing in order to record such analyzed result in the database.

Flow of Processing for the Log Server System

Figure 25:
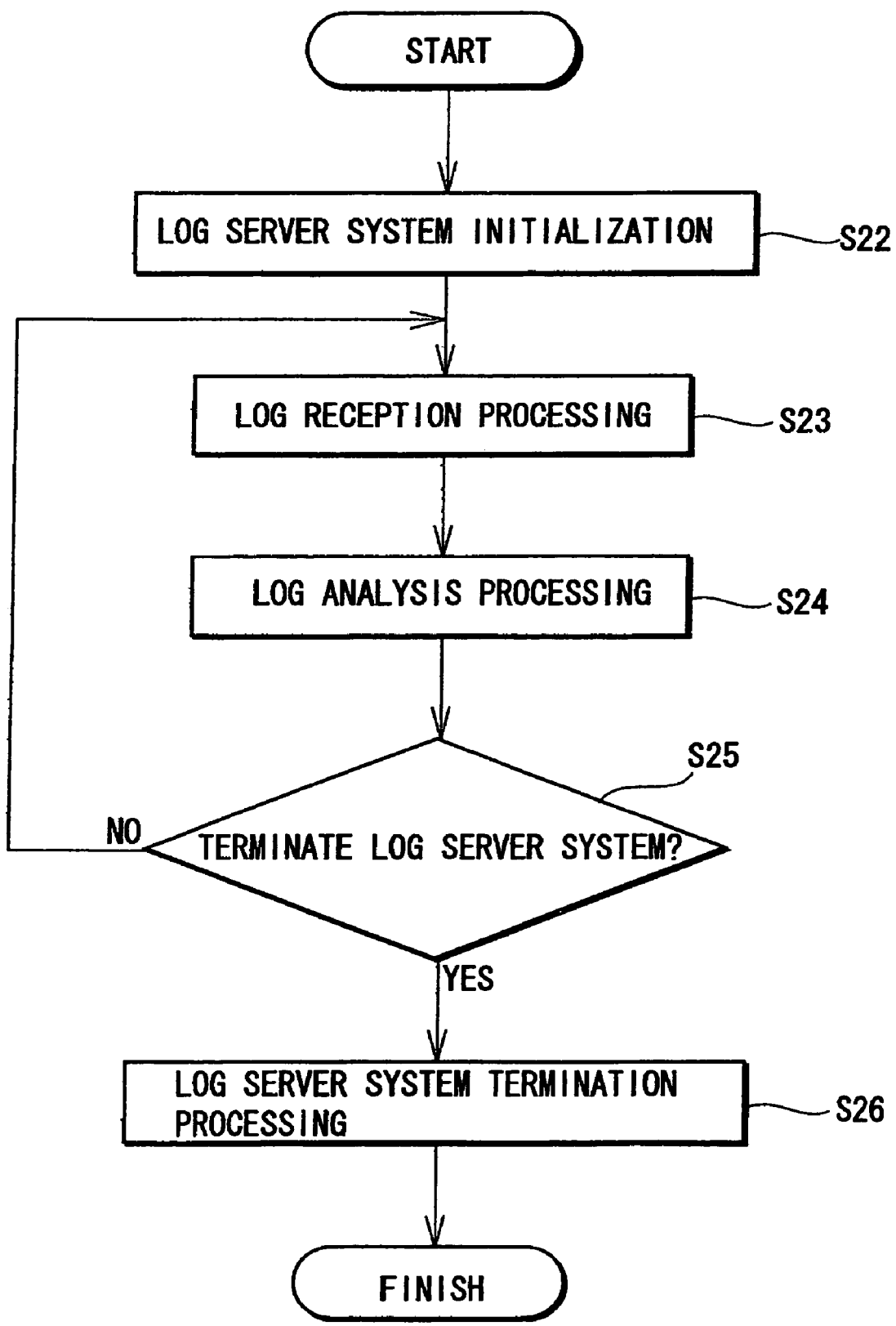
FIG. 25 is a flowchart illustrating the flow of a log server system.

The entire flow in the log server system will be described next with reference to FIG. 25. It should be noted that the processing illustrated in FIG. 25 is mainly conducted by CPU 61 of the log server 7. Firstly, as the processing of STEP S22, the log server system is initialized. In this initialization, the database manager is initialized in order for the log server system to use the database. Also initialized are computer resources for the log server 7 that require the above initialization of the database manager. Next, in the processing of STEP S23, the log server system is put in a log reception condition to receive signals (log information) transmitted from the log collection terminal device. Here, a stand-by condition continues until the log reception is completed.

When the log server receives the logs, the log server 7 executes analysis processing of the received logs in the processing of STEP S24. The analysis processing of the logs in STEP S24 executes respective appropriate analyses according to log analysis interface 70 that specifies the contents of the logs. Further, when terminating analysis of the logs, the log server system executes a termination check in the processing of STEP S25. Generally, since the log server system continues operation, the log server system returns to the processing of STEP S23 to come into the log reception condition. However, when the log server system determines that a termination order has been issued, processing proceeds to STEP S26 to execute termination processing of the log server system. Termination of the log server system indicates termination of the computer resources and the database manager that the log server system uses.

It should be noted that the flow of processing of the log server system illustrated in FIG. 25 is simply an example. Therefore, the flow of processing illustrated does not limit the processing of the log server system.

Flow of Log Reception

Figure 26:
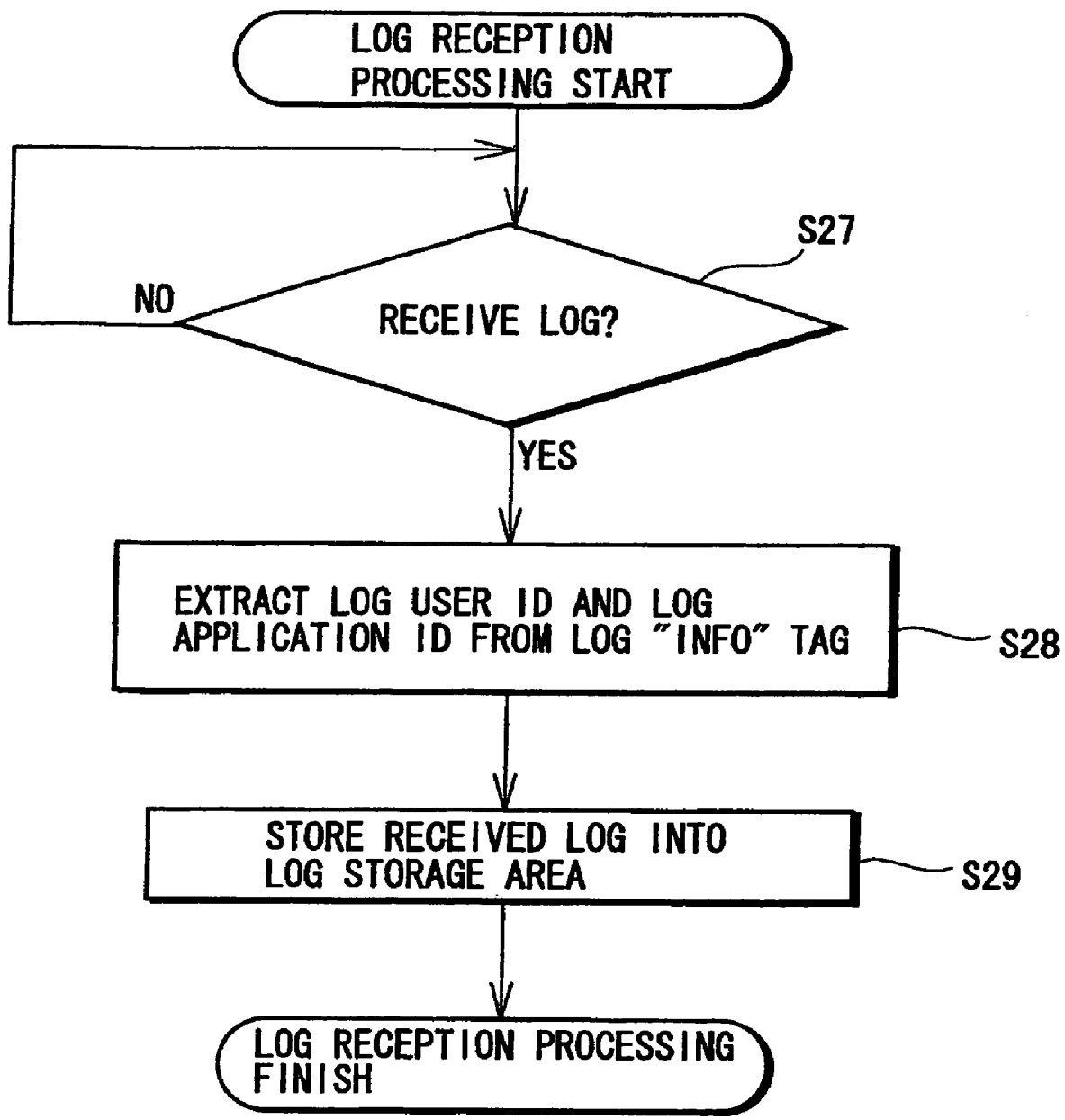
FIG. 26 is a flowchart illustrating the flow of log reception.

The flow in which the log server receives the log will now be explained using the flowchart of FIG. 26. Firstly, in the processing of STEP S27, a determination is made as to whether the log server has received logs. When the log server 7 has not received logs, the processing returns to STEP S27 itself, which processing is repeated until a log is received. When a log is received, processing proceeds to the processing of STEP S28 in which the <info> tag included in the log is read out. The <info> tag describes the log user ID and log appli. ID. Next, in the processing of STEP S29, the received log is stored in the log storage area 6 illustrated in FIG. 1.

The log storage area 6 is capable of being specified by the log user ID as well as the log appli. ID. The log user management table 76 of the log management database 75 is read out first. Then, the log storage table for user 80 is identified by using the log user ID. The received log is stored in the log storage table for user 80, and, at this time, a log reception ID is obtained. The log reception ID is a number for uniquely determining the log. In addition, the utilization log application management table 77 records the date and time the log is received and the log appli. ID in such a way as to match the former with the latter.

Next, the log application management table 78 of log management database 75 is read out. Then, the log storage table for the log application is identified by using the log appli. ID. The log reception ID, log reception date and time and log user ID are recorded in the table. The log reception ID is the log reception ID that is obtained when storing the log in the log storage table for user 80. In addition, the log reception date and time is the same reception date and time that was provided for the user. The reception processing is completed after the above-described processing.

Flow of Log Analysis Processing

Figure 27:
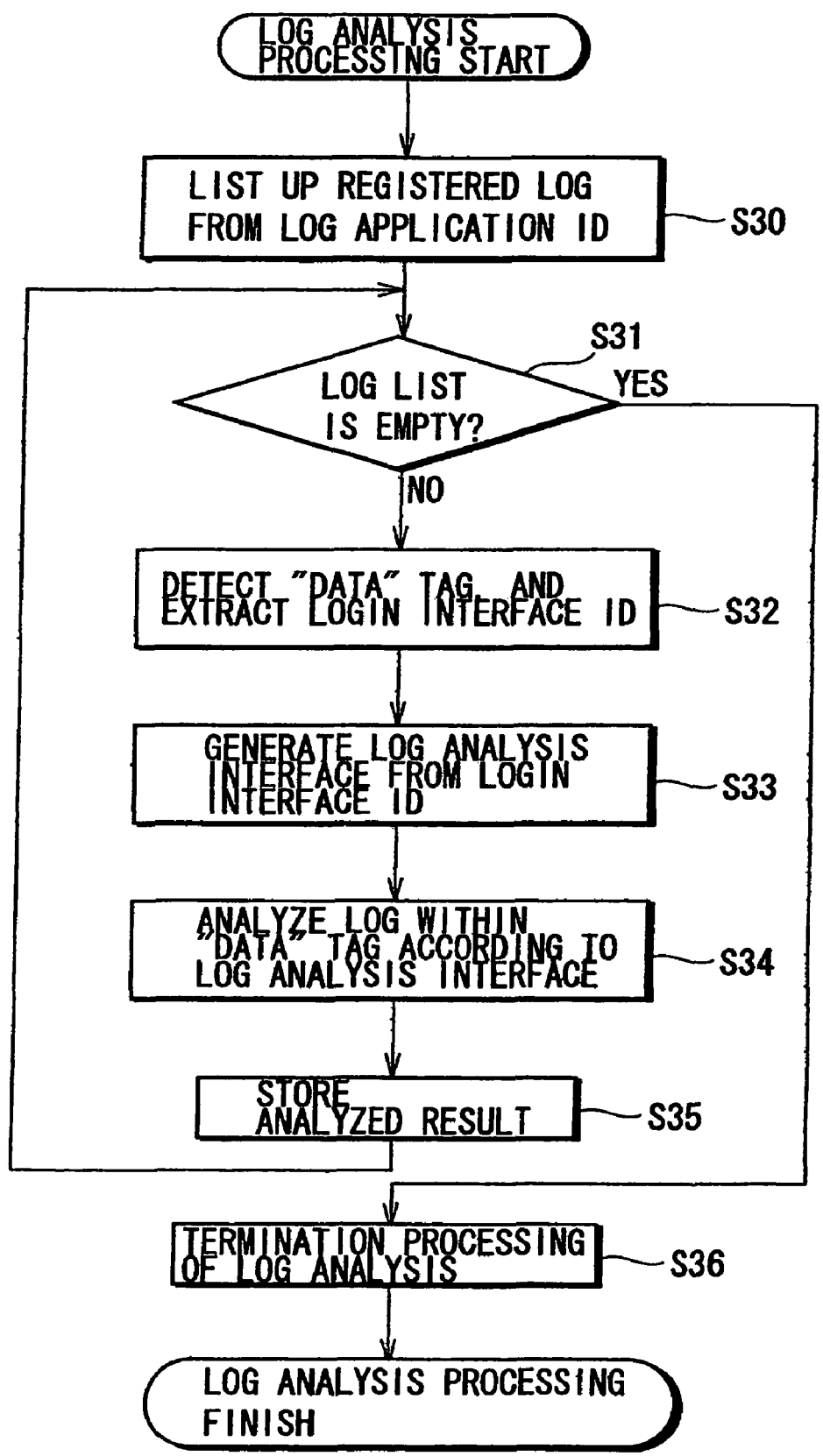
FIG. 27 is a flowchart illustrating the flow of log analysis.

Next, the flow of log analysis processing will be explained using the flowchart illustrated in FIG. 27. Firstly, when the log server 7 receives logs, analysis is started when the log is moved to the log storage area 6. Thus, in the processing of STEP S30, a log list of registered logs is pulled up on the basis of the log appli. ID. That is, a log list registered according to the log appli. ID is pulled up from the log storage table for log application 81 of the log storage database 79 illustrated in FIG. 20. The log list is prepared on the basis of the log appli. ID because the analysis in every analysis unit is executed in every log application unit. Next, in the processing of STEP S31, the log server 7 determines whether the log list is empty.

When the log list is empty in STEP S31, since it is not possible to execute a log analysis of the log application, the log analysis ends, and the processing proceeds to STEP S36, in which termination processing of log analysis is executed. When the log list includes logs, the processing proceeds to STEP S32 in which a log is pulled out from the log list and a login interface ID is pulled out from the <DATA> tag. Next, in the processing of STEP S33, the log analysis interface 70 is generated from the login interface ID. In this processing, the login interface management unit 69 illustrated in FIG. 17 is asked to generate the log analysis interface 70 with the result that it is possible to generate the log analysis interface 70. Next, in the processing of STEP S34, the log contained in the <DATA> tag is analyzed using the log analysis interface 70 generated in STEP S33. As a result, necessary items of data are extracted, and then, in the processing of STEP S35, the result illustrated in FIG. 24 is stored. Subsequently, the processing from STEP S31 to STEP S35 is repeated until the log list is empty.

Method for Providing Log Analyzed Result

Figure 28:
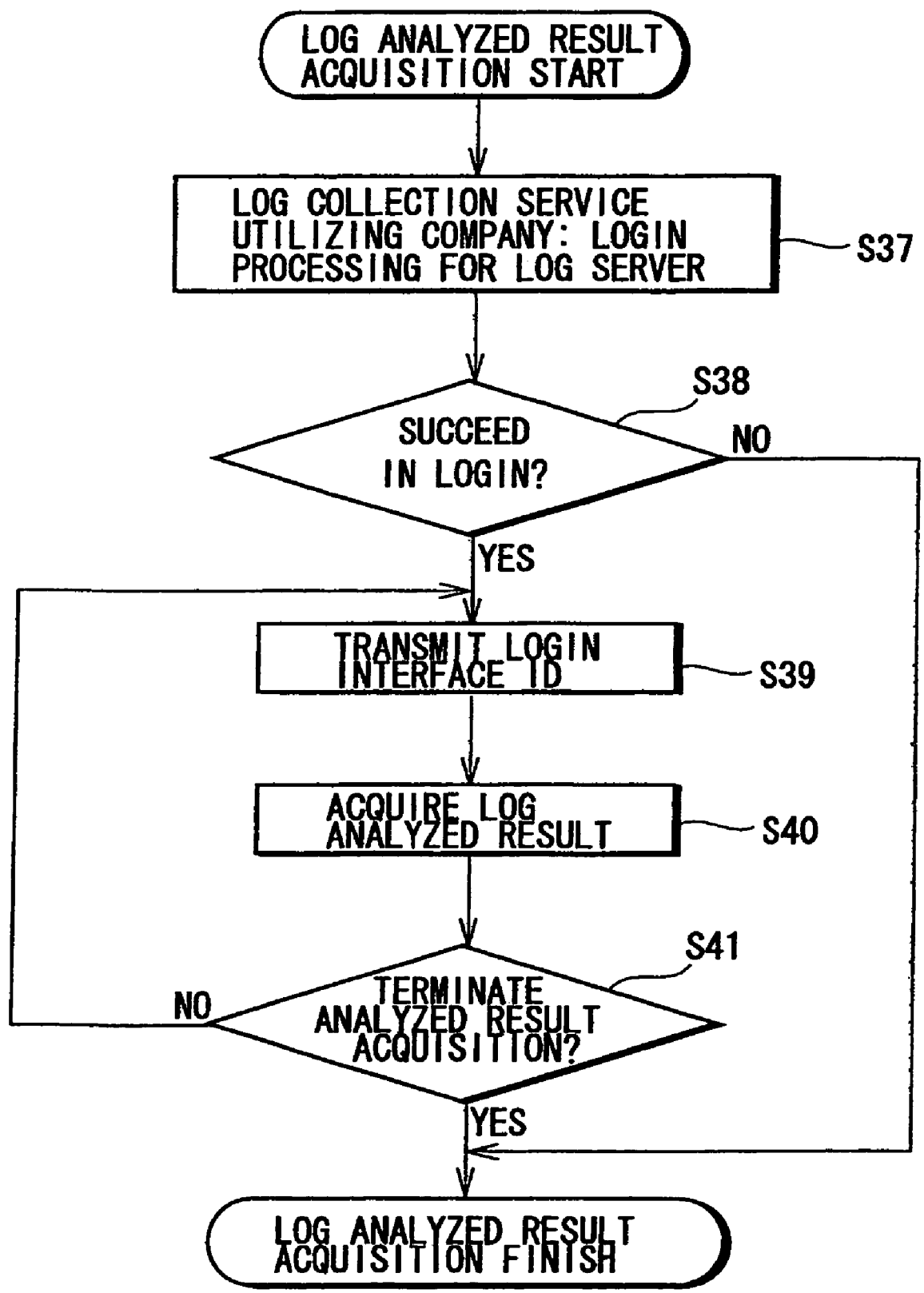
FIG. 28 is a flowchart illustrating the flow of acquisition of a log analyzed result utilizing the company side of a log collection service.

Next, a method for providing the log analyzed result analyzed by the log server 7 to the log collection service utilizing company that utilizes the log analyzed result will be explained using the flowchart illustrated in FIG. 28. FIG. 28 illustrates the flow in the case that log collection service utilizing companies 9 to 12, as log utilization terminal devices, require the log analyzed result acquired by the log server 7. Firstly, in the processing of STEP S37, the log collection service utilizing companies 9 to 12 execute login processing for the log server 7. Namely, each log collection service utilizing company transmits the name of the log collection utilization to the log server 7, i.e., transmits the licensee name and authentication data to the log server 7 via the internet 8 illustrated in FIG. 1. The log server 7 uses this information to authenticate the log collection service utilizing companies. Then, the processing of STEP S38 determines the authentication result. When the authentication data is determined to be effective data, the processing proceeds to STEP S39. On the other hand, when the authentication data is not effective, the fact that login processing has failed is input to the log server 7 and the log analyzed result acquisition processing is terminated.

Figure 29:
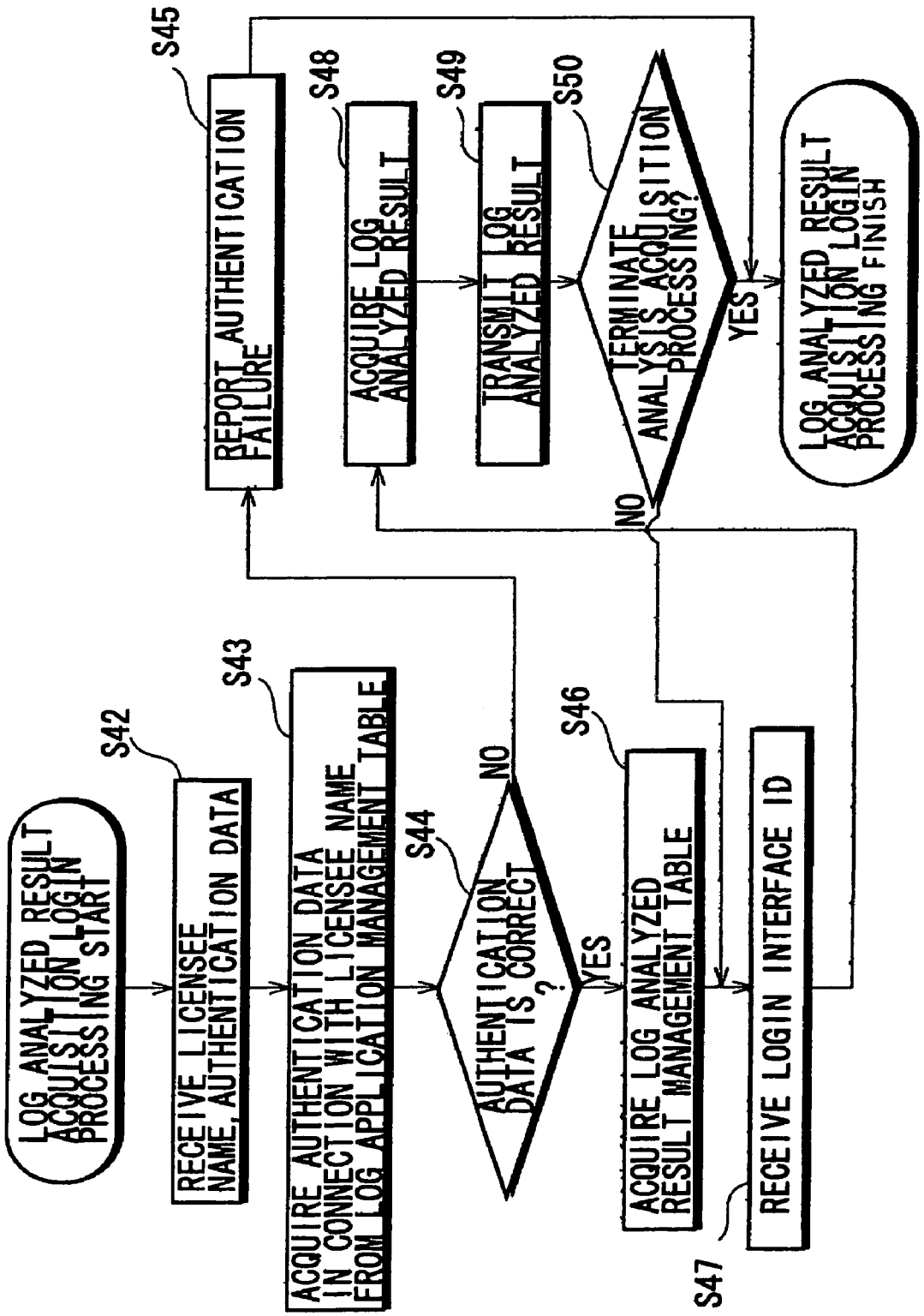
FIG. 29 is a flowchart illustrating the flow of acquisition of a log analyzed result at the log server side.

In STEP S38, when the log collection service utilizing company succeeds in login, the log collection service utilizing company enters a state in which log analyzed result acquisition is feasible. In STEP S39, the log collection service utilizing company specifies the log analyzed result it desires to obtain. Namely, the log collection service utilizing company specifies and then transmits the login interface ID. As a result, the analyzed result is retrieved from the log server 7, and then the processing of STEP S40 transmits the retrieval result to the log collection service utilizing company. Then, the processing of STEP S41 determines whether the log analyzed result acquisition processing is to be terminated. When additional log analyzed results are needed, the processing returns to the processing of STEP S39, at which point the processing of STEP S39 to STEP S41 are repeated. Here, when it is determined that no additional log analyzed results are needed, the log analyzed result acquisition processing is terminated As described above, the log collection service utilizing company is capable of acquiring desired log analyzed results. However, the login interface ID which may be specified is limited to the login interface 38 established by the log collection service utilizing company. When another login interface 38 is specified, no analyzed results are returned Next, the processing at the side of the log server 7 in this log analyzed result acquisition processing will be explained with reference to the flowchart illustrated in FIG. 29. Firstly, in STEP S42, the log server 7 processes the login requirements from the log collection service utilizing companies 9 to 12. Namely, the log server 7 acquires the licensee name and authentication data. Next, in the processing of STEP S43, the log server 7 retrieves the authentication data corresponding to the licensee name from the log application management table 78 illustrated in FIG. 18. Then, in the processing of STEP S44, the log server 7 determines whether the login is effective or not effective on the basis of the authentication data stored therein and the authentication data from the log collection service utilizing company.

When it is determined that the authentication data is correct, processing to provide the log analyzed result is started. Namely, in the processing of STEP S46, log server 7 acquires the corresponding log analyzed result management table 83 to receive the licensee name from the log application management table 78 illustrated in FIG. 19C. Then, in the processing of STEP S47, the log server 7 receives the login interface ID transmitted from the log collection service utilizing company. Next, in the processing of STEP S48, the log server 7 reads out the analyzed result from both the received login interface ID and the log analyzed result management table. Then, the log server 7 transmits the read out result to the log collection service utilizing company in the processing of STEP S49.

In the processing of STEP S50, the log server 7 determines whether the processing to read out analyzed results has been terminated by the log collection service utilizing company. If the log server 7 determines that the processing to read out analyzed results has not been terminated in this STEP S50, the processing returns to STEP S47, and the processing to read out log analyzed results is repeated. When the processing is to be terminated, the log server 7 executes processing to terminate log analyzed result acquisition. In addition, in the processing of STEP S44, when the log server 7 determines that the login is not effective, the log server 7 informs the log collection service utilizing company that the login has resulted in failure at STEP S45, and then the log analyzed result acquisition processing at the side of the log server 7 is terminated.

Figure 30:
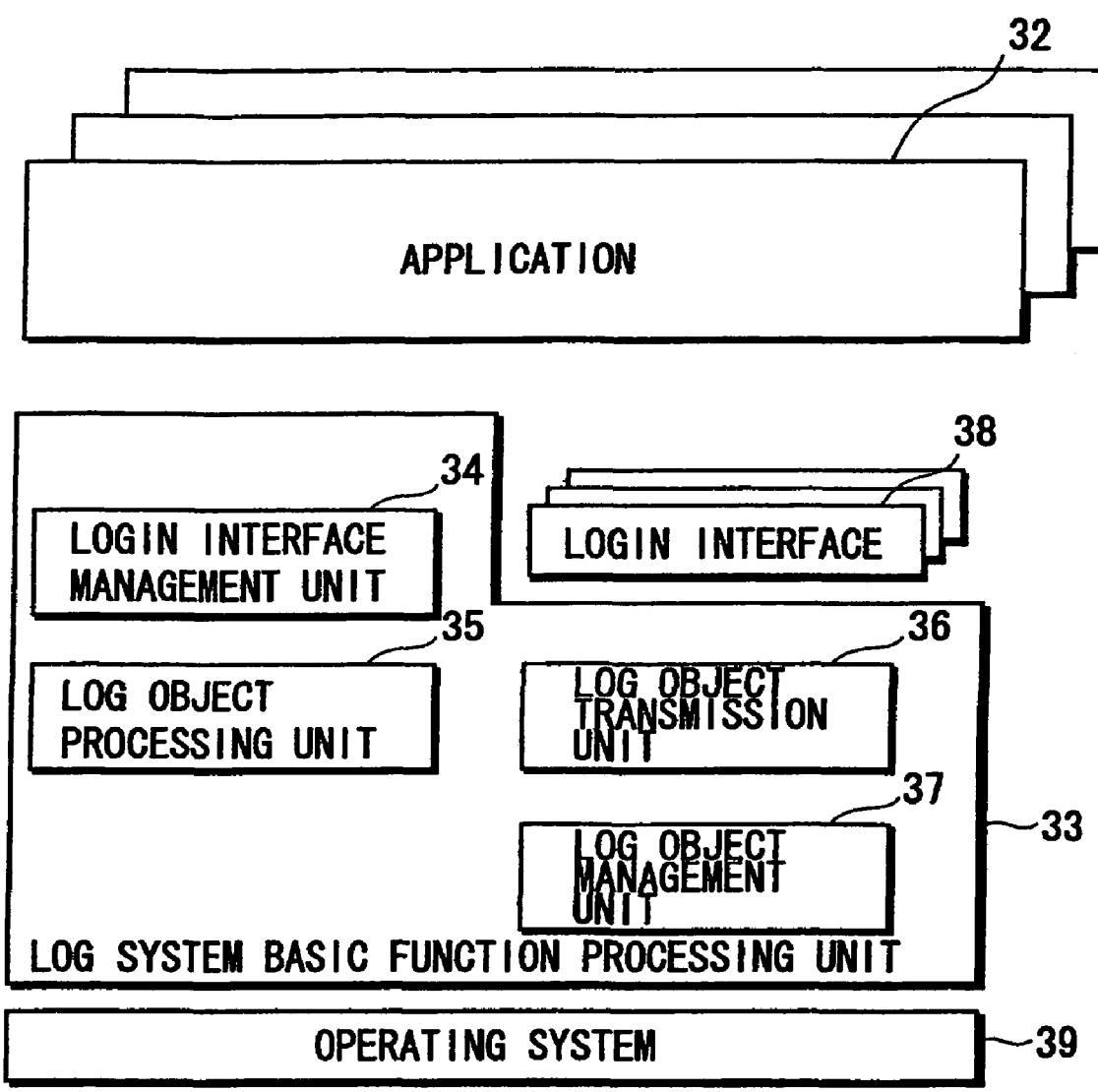
FIG. 30 is a view illustrating another configuration of log system at a log collection terminal device.

As described above, in the present embodiment of the log collecting/analyzing system, log collection terminal devices 1 to 4 collect logs to generate desired log information, and then the log information is transmitted to the log server 7. The log server 7 analyzes the received log information, and then the log collection service utilizing companies 9 to 12 receive the analyzed result It should be noted that, as illustrated in FIG. 8, the login interface 38 is designed and mounted within application 32 which utilizes basic functions. However, preferably, the login interface 38 is designed separately from the application 32 and is mounted independently from the application 32. Specifically, as illustrated in FIG. 30, the login interface management unit 34 of the log system basic function processing unit 33 manages a login interface 38 prepared independently from the above-described application 32. The application 32 calls the login interface 38, and then the login interface 38 generates the log information.

In addition, in the log collection service utilizing company, it is preferable that the hardware for acquiring the log analyzed result possesses the same function as that of the log collection terminal devices 1 to 4 as illustrated in FIG. 2, or it is preferable that the hardware for acquiring the log analyzed result possesses the configuration of a server of the type illustrated in FIG. 16. Then, as for displaying the acquired analyzed result, there is no particular limitation. The log analyzed result is defined beforehand with a specified form in accordance with the log collection service utilizing company According to the present invention, the function of the log collecting/analyzing system is divided into two functions in which one function is collecting log information, and the other function is analyzing the collected log information. Further, the function of collecting log information belongs to the client terminal device, while the function of analyzing the collected log information belongs to the log server. As a result, it is possible to specifically define the log collection function. Thus, it is possible to collect a more detailed log. For instance, in the case of games and so forth, what play modes are popular, or in the case of selecting a character for a game, what characters are popular, are useful information for designing the game. The useful information can be obtained by the present invention. For that reason, it is possible to make use of the results of log analysis to develop the game while performing feedback of the results of log analysis.

In addition, according to the present invention, log user information can be managed more accurately and then connected with the log analyzed result, whereby it is possible to obtain a compound analyzed result, such as that the game is popular with which age group and/or the game is popular with which sex. It is possible to record the behavior of the user at the application on the basis of such analyzed result. Namely, it is possible to dynamically change the function that permits development of the game according to the analyzed result. In addition, when the behavior of the user indicates that the user is puzzled as to how to use the application, it is possible to supply a more effective hint to the game user from collected logs.

In addition, according to the present invention, since it is possible to independently define the login interface for the sake of log collection, mounting of a login interface capable of reuse is possible according to the form of the log. For instance, the log may be one in which the user's taste is collected, and so forth. By this effect, the login interface for certain applications may be replaced with the same login interface. Accordingly, the same login interface may be utilized at the application. Thus, it is possible to improve the development efficiency for the sake of log collection.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A log collecting and analyzing system, comprising:
a client terminal device having
a collect unit for collecting log information; and
a transmit unit for transmitting said collected log information to a log server via a network;
a log server having a store and analyze unit for storing and analyzing said log information transmitted from said client terminal device;
a log utilizing terminal having
a request unit for pre-defining an analysis procedure for execution by said store and analyze unit to produce an analyzed result and for requesting the result of determined log information analyzed by said log server via a network according to said analysis procedure; and
a receive unit for receiving said analyzed result of log information transmitted from said log server,
wherein said store and analyze unit in said log server is configured to execute said analysis procedure pre-defined by said log utilizing terminal device.

2. The log collecting and analyzing system according to claim 1, wherein said client terminal device further comprises:
a form unit for forming a basic structure of a log, and
a generate unit for generating determined log information from the basic structure of said log.

3. The log collecting and analyzing system according to claim 2, wherein
the form unit is operable to form a tree structure consisting of nodes and elements as the basic structure of a log, and
the generate unit is operable to generate the determined log information hierarchically utilizing the tree structure.

4. The log collecting and analyzing system according to claim 1, wherein said client terminal device manages said collected log information independently for each application program.

5. The log collecting and analyzing system according to claim 1, wherein said client terminal device stores said collected log information under an off-line condition except for log information transmission processing for said log server.

6. The log collecting and analyzing system according to claim 1, wherein said client terminal device stores said collected log information in a determined log form.

7. The log collecting and analyzing system according to claim 1, wherein said store and analyze unit is operable to pull out necessary information from said log information transmitted from said client terminal device and analyze said necessary information.

8. The log collecting and analyzing system according to claim 1, wherein said log server is operable to manage said log information transmitted from said client terminal device independently for each application program.

9. The log collecting and analyzing system according to claim 1, wherein said log server is operable to store said log information transmitted from the client terminal device in a determined form.

10. The log collecting and analyzing system according to claim 1, wherein said log server and said client terminal device are operable to manage at least duration of service for log collection or the number of times for log collection.

11. A method for analyzing log information, comprising:
receiving log information transmitted to a log server via a network from a log collection terminal device;
storing the received log information at said log server,
analyzing said log information stored at said log server by using a log analyzing interface to perform analyzing procedures pre-defined by a log utilizing terminal device,
storing the result of said analyzing at said log server, and and transmitting the result of said analyzing to said log utilizing terminal device over a network.

12. The method for analyzing log information, according to claim 11, further comprising:
analyzing the stored log information for each application program utilizing a database provided with a log management database, a log storage database and a log analyzed result management database,
wherein said log management database is operable to record information identifying a log application program utilized by a log user,
said log storage database is operable to manage log information registered in a log application program, and
said log analyzed result management database operable to manage said analyzed log information.

13. A computer-readable recording medium having instructions recorded thereon, the instructions being executable by a processor to perform a method of log analysis, the method comprising:
receiving log information transmitted from a log collection terminal device to a log server via a network;
storing the received log information at said log server;
analyzing said log information stored at said log server by using a log analyzing interface to perform analyzing procedures pre-defined by a log utilizing terminal device;
storing the result of said analyzing at said log server,
and transmitting the result of said analyzing to said log utilizing terminal device over a network.

14. The recording medium according to claim 13, wherein the method further comprises:
analyzing the stored log information for each application program utilizing a database provided with a log management database, a log storage database and a log analyzed result management database, wherein
said log management database is operable to record information identifying a log application program is utilized by a log user,
said log storage database is operable to manage log information registered in a log application program, and
said log analyzed result management database is operable to manage said analyzed log information.

15. A log analyzing device, comprising:
at least one processor;
an operating system executable on said at least one processor for operating a log analyzing system; and
a log server function processing unit for analyzing received log information and storing an analyzed result;
wherein said log server function processing unit includes
a log analysis interface management unit for managing a log analysis interface,
a log object analysis unit for analyzing said received log information by using a log analyzing interface to perform analyzing procedures pre-defined by a log utilizing terminal device,
a log object reception unit for controlling a function for receiving log information transmitted from a log collection terminal device via a network,
a log analyzed result management unit for storing said analyzed result,
and said log server is configured to transmit said analyzed result to said log utilizing terminal device over a network.

16. The log analyzing device according to claim 15, further comprising:
log management database for managing at least which log application program is utilized by a log user;
log storage database for managing log information registered in a log application program; and
log analyzed result management database for managing said analyzed log information.

17. A log server, comprising:
a receiver for receiving log information transmitted from a log collection terminal device;
a storing and analyzing unit for storing said received log information and pulling out necessary information to analyze from said received log information;
wherein said store and analyze unit is configured to execute analyzing procedures pre-defined by a log utilizing terminal device to produce an analyzed result, and
said log server is configured to transmit said analyzed result to said log utilizing terminal device over a network.

18. The log server according to claim 17, wherein said received log information is independently managed for each application program.

19. The log server according to claim 17, wherein said received log information is stored in a determined form.

20. The log server according to claim 17, further comprising:
a management unit for managing at least duration of service for log collection or the number of times for log collection.

21. The log server according to claim 17, further comprising:
a transmitter for transmitting an analyzed result to a log utilizing terminal device.

22. The log collecting and analyzing system according to claim 1, wherein said log server is operable to select said analysis procedure from a plurality of predetermined analysis procedures.

* * * * *

UNITED STATES PATENT AND TRADEMARK OFFICE
CERTIFICATE OF CORRECTION

PATENT NO. : 8,090,771 B2
APPLICATION NO. : 12/456452
DATED : January 3, 2012
INVENTOR(S) : Yousuke Kimoto and Kazuhiro Kanee It is certified that error appears in the above-identified patent and that said Letters Patent is hereby corrected as shown below:

In the specification:

At column 20, line 2 after "program" delete "is".

Signed and Sealed this
Twelfth Day of February, 2013

Teresa Stanek Rea
*Acting Director of the United States Patent and Trademark Office*